US011452067B2

(12) United States Patent
Ozturk et al.

(10) Patent No.: US 11,452,067 B2
(45) Date of Patent: Sep. 20, 2022

(54) SECURE PAGING FOR SERVICE PRIORITIZATION

(71) Applicant: QUALCOMM Incorporated, San Diego, CA (US)

(72) Inventors: Ozcan Ozturk, San Diego, CA (US); Soo Bum Lee, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 17/014,911

(22) Filed: Sep. 8, 2020

(65) Prior Publication Data

US 2021/0092706 A1   Mar. 25, 2021

Related U.S. Application Data

(60) Provisional application No. 62/905,982, filed on Sep. 25, 2019.

(51) Int. Cl.
*H04W 68/00* (2009.01)
*H04W 12/06* (2021.01)
*H04W 76/11* (2018.01)
*H04L 9/32* (2006.01)
*H04W 76/25* (2018.01)
(Continued)

(52) U.S. Cl.
CPC ......... *H04W 68/005* (2013.01); *H04L 9/3242* (2013.01); *H04W 12/037* (2021.01); *H04W 12/06* (2013.01); *H04W 12/106* (2021.01); *H04W 76/11* (2018.02); *H04W 76/25* (2018.02); *H04L 2209/80* (2013.01)

(58) Field of Classification Search
CPC . H04W 68/005; H04W 12/037; H04W 12/06; H04W 12/106; H04W 76/11; H04W 76/25; H04L 9/3242; H04L 2209/80; H04L 9/0894; H04L 9/14
See application file for complete search history.

(56) References Cited

U.S. PATENT DOCUMENTS

| 2018/0270790 | A1* | 9/2018 | Shi | H04W 52/0209 |
| 2020/0221281 | A1* | 7/2020 | Rajadurai | H04L 9/3242 |
| 2021/0014827 | A1* | 1/2021 | Rune | H04W 68/025 |

* cited by examiner

*Primary Examiner* — Jamal Javaid
*Assistant Examiner* — Shawn D Miller
(74) *Attorney, Agent, or Firm* — Arent Fox, LLP

(57) ABSTRACT

This disclosure provides systems, methods and apparatus, including computer programs encoded on computer storage media, for encrypting paging information transmitted to a user equipment (UE) in a paging message. In one aspect, a base station (BS) encrypts paging information and transmits a paging message to one of a UE or another BS for transmission to the UE. The paging message includes the encrypted paging information. A UE receives the paging message from a BS including the encrypted paging information. The UE decrypts the encrypted paging information to identify paging information, and determines whether to communicate with the BS based on the paging information. The paging information may be encrypted and the encrypted paging information decrypted based on information configured or obtained during at least one of a registration procedure or a radio access network (RAN)-based Notification (Continued)

Area Update (RNAU). Confidentiality of paging information in paging messages may thereby be improved.

28 Claims, 11 Drawing Sheets

(51) Int. Cl.
*H04W 12/037* (2021.01)
*H04W 12/106* (2021.01)

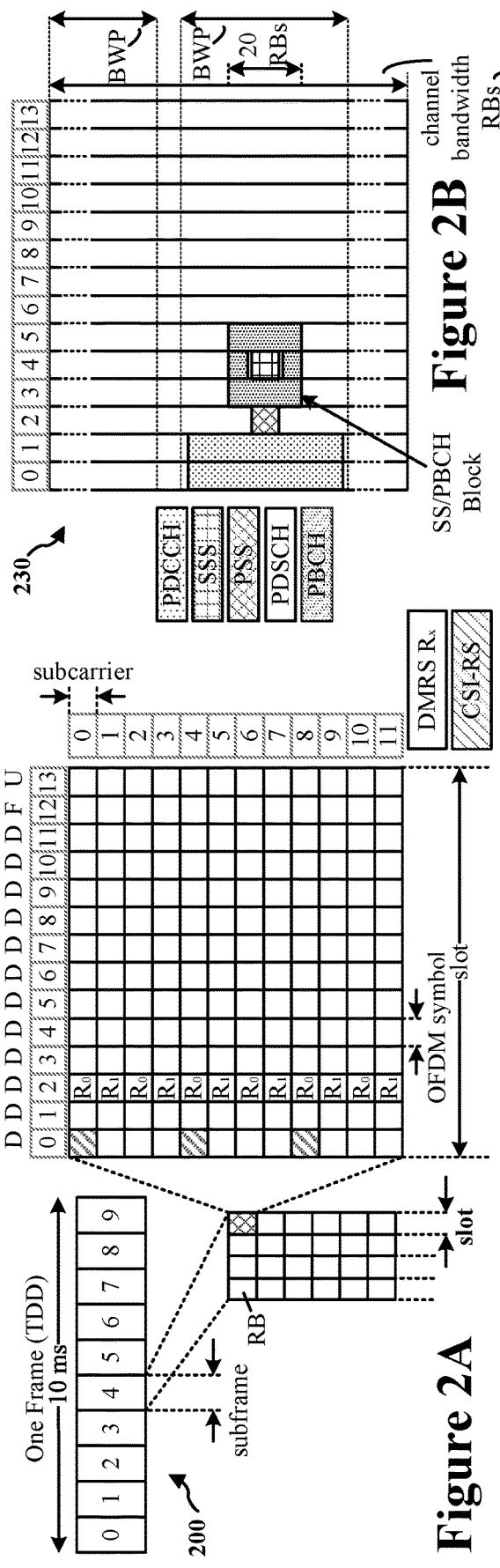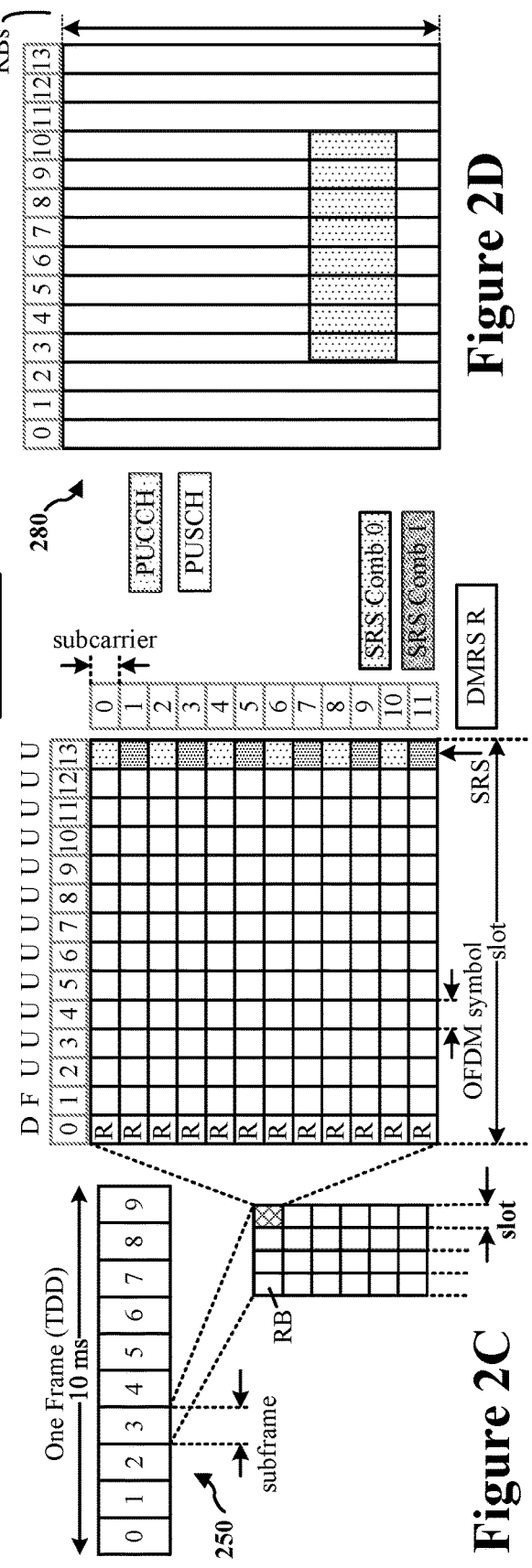

SECURE PAGING FOR SERVICE PRIORITIZATION

CROSS REFERENCE TO RELATED APPLICATION(S)

This Patent Application claims priority to U.S. Provisional Patent Application No. 62/905,982, filed on Sep. 25, 2019, entitled "SECURE PAGING FOR SERVICE PRIORITIZATION" and assigned to the assignee hereof. The disclosure of the prior Provisional Patent Application is considered part of and is incorporated by reference in this Patent Application.

TECHNICAL FIELD

The present disclosure relates generally to communication systems, and more particularly, to a wireless communication system between a user equipment (UE) and a base station (BS).

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements also may be applicable to other multi-access technologies and the telecommunication standards that employ these technologies.

SUMMARY

The systems, methods and devices of this disclosure each have several innovative aspects, no single one of which is solely responsible for the desirable attributes disclosed herein.

One innovative aspect of the subject matter described in this disclosure can be implemented in an apparatus of a user equipment (UE). The apparatus includes an interface that obtains a paging message from a base station (BS). The paging message includes encrypted paging information. The apparatus includes a processing system that decrypts the encrypted paging information to identify paging information, and determines whether to communicate with the BS based on the paging information. The encrypted paging information is decrypted based on information obtained during at least one of a registration procedure or a radio access network (RAN)-based Notification Area Update (RNAU).

In some implementations, the paging information may include at least one of traffic type or priority. In some implementations, the encrypted paging information may include an index associated with the paging information, the information may include a mapping between different paging information and indices associated with the different paging information, and the encrypted paging information may be decrypted based on the mapping. The mapping may be received during the registration procedure. The information may further include an updated mapping between the different paging information and the indices associated with the different paging information, and the updated mapping may be received during the registration procedure, received during the radio access network (RAN)-based Notification Area Update (RNAU), or based on an identifier of the UE.

In some implementations, the mapping may include a fixed mapping, and the index may be scrambled based on a shared key between the UE and the BS. The shared key may include a non-access stratum (NAS) ciphering key or an access stratum (AS) ciphering key.

In some implementations, the encrypted paging information may include a temporary mobile subscriber identifier (TMSI) associated with the UE, where the information includes an association of different TMSI with different paging information, and the encrypted paging information may be decrypted based on the association. In some implementations, the information may further include an offset, and the apparatus may modify the TMSI based on the offset to identify the paging information. In some implementations, the apparatus may determine a paging occasion for receiving the paging message based on a primary TMSI of the UE. The apparatus may transmit the primary TMSI in one of a Radio Resource Control (RRC) Connection Request or a RRC Connection Re-establishment Request to the BS.

In some implementations, the encrypted paging information may include a radio network temporary identifier (RNTI) associated with the UE, where the information includes an association of different RNTI with different paging information, and the encrypted paging information may be decrypted based on the association. In some implementations, the information further includes an offset, and the apparatus may modify the RNTI based on the offset to identify the paging information. The apparatus may transmit a primary RNTI of the UE in a Radio Resource Control (RRC) Connection Resume Request to the BS, and the information may include the primary RNTI.

In some implementations, the paging message may include integrity protection code for the paging information. In some implementations, the apparatus may decrypt the encrypted paging information by generating a code based on the paging information, descrambling the integrity protection code based on a key, and comparing the generated code to the descrambled integrity protection code. The integrity protection code may include a Message Authentication Code-Integrity (MAC-I).

In some implementations, the apparatus may transmit one of a service request or a resume request to the BS. The service request or the resume request may include the paging information. In some implementations, the paging information in the service request or the resume request may be encrypted. In some implementations, the service request or the resume request may be integrity protected.

Another innovative aspect of the subject matter described in this disclosure can be implemented in an apparatus of a BS. The apparatus includes a processing system that encrypts paging information based on information configured during at least one of a registration procedure or a radio access network (RAN)-based Notification Area Update (RNAU), and an interface that outputs a paging message for transmission to one of a UE or another BS for transmission to the UE. The paging message includes the encrypted paging information.

In some implementations, the paging information may include at least one of traffic type or priority. In some implementations, the encrypted paging information may include an index associated with the paging information, the information includes a mapping between different paging information and indices associated with the different paging information, and the paging information may be encrypted based on the mapping. The mapping may be received from a network during one of paging of the UE or connection of the UE to the BS. In some implementations, the apparatus may update the mapping between the different paging information and the indices associated with the different paging information during the registration procedure, during the radio access network (RAN)-based Notification Area Update (RNAU), or based on an identifier of the UE.

In some implementations, the mapping may include a fixed mapping, and the apparatus may encrypt the paging information by scrambling the index based on a shared key between the UE and the BS. The shared key may include a non-access stratum (NAS) ciphering key or an access stratum (AS) ciphering key.

In some implementations, the apparatus may transmit the mapping to another base station.

In some implementations, the apparatus may encrypt the paging information by associating a radio network temporary identifier (RNTI) of the UE with the paging information. The encrypted paging information may include the RNTI, the information may include an association of different RNTI with different paging information, and the paging information may be encrypted based on the association. The apparatus may receive a primary RNTI of the UE in a Radio Resource Control (RRC) Connection Resume Request from the UE, and the information may include the primary RNTI. In some implementations, the apparatus may transmit the RNTI of the UE associated with the paging information to another base station.

In some implementations, the paging message may include integrity protection code for the paging information, and the apparatus may encrypt the paging information by scrambling the integrity protection code based on a key. The integrity protection code may include a Message Authentication Code-Integrity (MAC-I).

In some implementations, the apparatus may receive one of a service request or a resume request from the UE. The service request or the resume request may include the paging information. In some implementations, the paging information in the resume request may be encrypted. In some implementations, the resume request may be integrity protected.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 2A, 2B, 2C and 2D are diagrams illustrating examples of a first 5G/NR frame, downlink (DL) channels within a 5G/NR subframe, a second 5G/NR frame, and uplink (UL) channels within a 5G/NR subframe, respectively.

Like reference numbers and designations in the various drawings indicate like elements.

DETAILED DESCRIPTION

Figure 1:
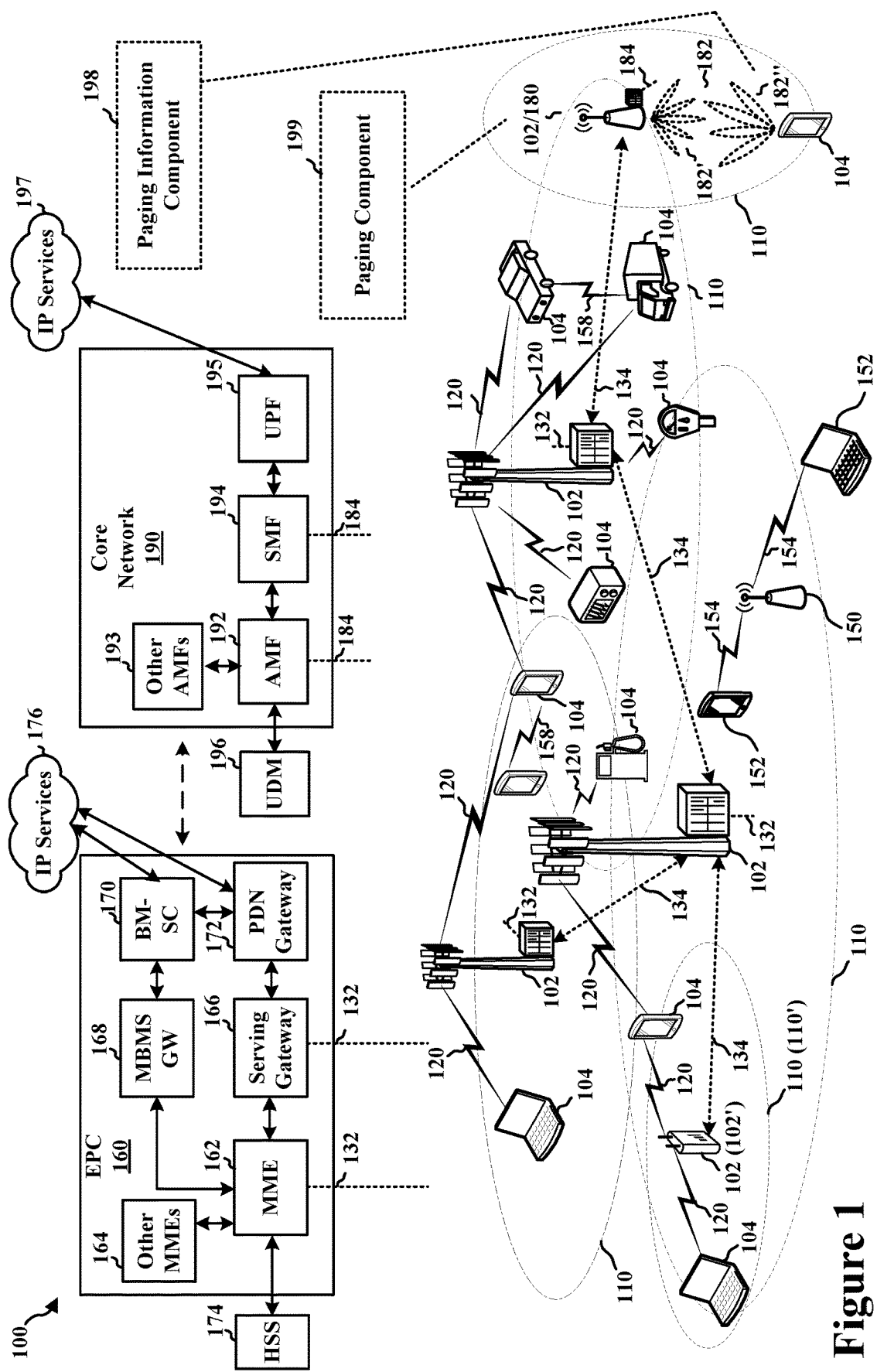
FIG. 1 is a diagram illustrating an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Many user equipments (UEs) support multiple Universal Subscriber Identity Modules (USIMs) which allow UEs to communicate with different systems. For example, a UE incorporating a travel Subscriber Identity Module (SIM) card connected to one Public Land Mobile Network (PLMN) may receive local calls in one country while receiving international calls associated with a different PLMN in another country. However, a multi-USIM (MUSIM) UE typically uses common radio and baseband components that are shared among the multiple USIMs, which may prevent the UE from actively communicating using multiple USIMs at the same time. Therefore, while actively communicating using a first USIM, a MUSIM UE may need to occasionally monitor for paging requests from the different system associated with a second USIM. The UE may respond to the paging message by suspending the connection of the first USIM and establishing the connection for the second USIM.

Each USIM of a MUSIM UE may be associated with a mode (or RRC state), including an idle mode (such as an RRC_IDLE state), an inactive mode (such as an RRC_INACTIVE state), or a connected mode (such as an RRC_CONNECTED state). In the idle and inactive modes, the UE does not have an established RRC connection with the BS, while in the connected mode, the UE has an established RRC connection with the BS. Therefore, if a first USIM is in the connected mode and the second USIM is in the idle or inactive mode, the MUSIM UE may monitor for paging requests at the second USIM. If a paging request is received, the UE may establish a connection and transition the second USIM to the connected mode.

Depending on the mode for the USIM, the UE may receive core network (CN)-based paging or radio access network (RAN)-based paging. For example, when the UE is in the idle mode, the UE may monitor for and receive CN-based paging initiated by the AMF (in 5G) or the MIME (in LTE). When the UE is in the inactive mode, the UE may additionally monitor for and receive RAN-based paging initiated by the gNB (such as an anchor gNB). The UE may be identified in the paging message based on a UE identifier (UE ID), which may differ depending on whether CN-based paging or RAN-based paging is received. For example, in CN-based paging, the paging message may include a 5G-S-Temporary Mobile Subscriber Identity (5G-S-TMSI) as the UE ID, while in RAN-based paging, the paging message may include an I-Radio Network Temporary Identifier (I-RNTI) as the UE ID.

The UE may receive CN-based paging messages or RAN-based paging messages in paging occasions (POs). A PO is a set of PDCCH monitoring occasions which may consist of multiple subframes or OFDM symbols where a paging message can be received. When the UE is in either the idle mode or the inactive mode, the UE may use discontinuous reception (DRX) to reduce power consumption and may monitor one PO in each DRX cycle.

To assist the MUSIM UE in determining whether to respond or not to the paging message, the network may include paging information in the paging message. The paging information may include the traffic type or priority of the traffic that triggered the paging (such as the paging cause). For example, a MUSIM UE may decide to suspend the connection of the first USIM in favor of the traffic for the second USIM if the paging information indicates that the traffic is a voice call rather than a data message, or if the paging information indicates that the voice call is an Internet Protocol (IP) Multimedia Subsystem (IMS) emergency call rather than a lower priority, non-IMS voice call. Other examples of traffic types may include, but are not limited to, IMS and non-IMS based voice service, IMS and non-IMS based Short Messaging Service (SMS) or Unstructured Supplementary Service Data (USSD), IMS service other than voice or SMS, or other services not listed above such as data services including video. The priority of the traffic may be explicitly identified in the paging information, or may be inferred from the traffic type.

However, as the paging message is not generally ciphered, including the traffic type in the paging message may pose a security risk, since the paging information may disclose sensitive information about the UE. For example, a malicious observer intercepting a paging message may ascertain that an IMS voice call is attempting to be sent to a particular UE ID. A need therefore exists to improve user privacy by providing confidentiality of the paging information. The present disclosure addresses this need by encrypting the paging information so that only the paged UE should be able to identify the paging information. The paging information may be encrypted according to various examples (described below). As a result, the present disclosure provides confidentiality of the paging information and improves user privacy, while a malicious observer may have more difficulty in ascertaining the paging information.

In one example, during a registration (such as an attach) or registration update procedure, the core network (such as the AMF or MME) or base station may dynamically configure the UE with a mapping between the traffic type or priority and an index (such as a numeric or non-numeric value), and the paging information may include the index. The BS may be an anchor gNB or eNB for the UE, and the BS also may send the mapping to neighboring base stations in the RAN area of the UE using a backhaul interface during RAN-based paging. The BS also may send the paging message to a neighboring base station for transmission to the UE. When the UE receives the paging message, the UE may decrypt the traffic type or priority based on the received index.

When the mapping is dynamically configured, the mapping may be updated for additional security. In one example, the core network may update the mapping during registration of the UE to the BS when the UE is in RRC_IDLE mode and undergoing CN-based paging. The core network may deliver the updated mapping to the BS (gNB or eNB) during CN-based paging, or during setup of an N2 interface (such as between the AMF and gNB) or S1 interface (such as between the MME and eNB) when the UE is connected to the BS. The base station also may update the mapping during a RAN notification area update (RNAU) when the UE is in RRC_INACTIVE mode and undergoing RAN-based paging. Additionally, when the core network updates the 5G-S-TMSI during registration or connection of the UE to the BS, or when the base station updates the I-RNTI during a RNAU, the core network or BS may update the mapping by deriving new indices for the mapping based on the updated UE ID.

Alternatively, the mapping may be statically configured (such as a fixed mapping), and the core network or BS may scramble the index associated with the traffic type or priority using a shared key between the UE and the network. The shared key may be a non-access stratum (NAS) ciphering key or an access stratum (AS) ciphering key. The core network may use the NAS ciphering key when encrypting CN-based paging, while the BS may use the AS ciphering key when encrypting RAN-based paging. When the UE receives the paging message, the UE may decrypt the index based on the shared key.

In a further example, in CN-based paging, the AMF may assign a different 5G-S-TMSI value for each traffic type. For example, the AMF may assign a first S-TMSI value for a first traffic type (for instance, a voice call), and a second S-TMSI value for a second traffic type (for instance, a data message). The AMF may include the assigned 5G-S-TMSI in the paging message to the UE. Alternatively, the AMF may signal a single 5G-S-TMSI value to the UE, and the UE may modify this value to derive the other 5G-S-TMSI values. For example, the UE may add different integer values to the signaled value to identify each respective traffic type.

A primary 5G-S-TMSI, which may be different from the aforementioned 5G-S-TMSI, may be assigned to the UE for identification, for example, during registration of the UE. The UE may determine the PO for the paging message based on the primary 5G-S-TMSI. When the UE receives the paging message in the PO, the UE may identify the traffic type based on the assigned 5G-S-TMSI value received in the paging message or the modified 5G-S-TMSI value derived from the signaled value. The UE may use the primary 5G-S-TMSI or the assigned/modified 5G-S-TMSI when signaling to the network, for example, during an RRC connection establishment procedure in response to the paging message.

Similarly, in RAN-based paging, the BS may assign a different I-RNTI value for each traffic type. For instance, the BS may assign a first I-RNTI value for a first traffic type (for instance, a voice call), and a second I-RNTI value for a second traffic type (for instance, a data message). The BS may include the assigned I-RNTI in the paging message to the UE. Alternatively, the BS may signal a single I-RNTI value to the UE, and the UE may modify this value to derive the other I-RNTI values. For example, the UE may add different integer values to the signaled value to identify each respective traffic type. The BS may be an anchor gNB or eNB for the UE, and the BS may send the assigned I-RNTI to neighboring base stations in other cells of the UE's RAN area when paging the UE.

A primary I-RNTI, which may be different from the aforementioned I-RNTI, may be assigned to the UE for identification, for example, during a RNAU procedure. When the UE receives the paging message, the UE may identify the traffic type based on the assigned I-RNTI value received in the paging message or the modified I-RNTI value derived from the signaled value. The UE may use the primary I-RNTI or the assigned/modified I-RNTI when signaling to the network, for example, during an RRC connection resume procedure in response to the paging message.

In an additional example, during CN or RAN-based paging, the paging information (and optionally the UE ID) may be encrypted using integrity protection information, for example, based on a Message Authentication Code-Integrity (MAC-I). A MAC-I is a cryptographic checksum on data which can be used to detect accidental and intentional modifications of data using a key. The base station may generate the MAC-I based on a shared key, such as the AS ciphering key referenced above, and append it to the paging message. When the UE receives the paging message, the UE may generate a code (such as the expected MAC-I), descramble the received MAC-I based on the shared key, and compare the expected MAC-I to the received MAC-I to verify the integrity of the paging information. The MAC-I may thus provide additional protection if the paging information in any of the aforementioned examples is intercepted and tampered. When the UE responds to the paging message, for example, in a service request for CN-based paging or a resume request for RAN-based paging, the UE also may transmit the paging information with integrity protection so that the core network or base station may confirm that the UE's request corresponds to the paging cause. For example, when the UE responds with a resume request, the UE may calculate a MAC-I associated with the request (such as shortResumeMAC-I or another name) based on scrambled paging information.

Particular implementations of the subject matter described in this disclosure can be implemented to realize one or more of the following potential advantages. The present disclosure may improve the confidentiality of CN-based and RAN-based paging information. Additionally, by allowing a BS and UE to respectively encrypt and decrypt paging information, the present disclosure may improve user privacy of paging messages. Also, the techniques described herein may cause a malicious observer to have more difficulty in ascertaining the paging information for a specified UE. To encrypt the paging information, the network or base station may dynamically configure the UE with a mapping between the traffic type or priority and an index, and the mapping may be regularly updated for additional security. Thus, the mapping may be unique for different UEs at the same time, or for the same UE at different times. The network or base station also may statically configure a fixed mapping and scramble the index using a shared key with the UE. Further, security of the paging information may be maintained even without dynamic mapping configuration. The network or base station also may assign different UE identities (such as 5G-S-TMSI or I-RNTI) for each traffic type, either explicitly or by inference through a single signaled value for the UE to modify. The use of regularly updated UE identities may further increase the difficulty of a malicious observer in ascertaining the paging information. To prevent possible compromise to the paging information in the event a malicious observer successfully intercepts the paging message, the network or base station may apply an integrity protection code to the paging message which the UE may decrypt to confirm the message's integrity.

The techniques described herein also may prevent other problems caused by compromises to the paging information. For example, compromised paging information may cause the UE to wake up from a DRX cycle to unnecessarily initiate an RRC connection, which may result in significant battery consumption by the UE. In another example, compromised public warning system (PWS) notifications may include misleading information regarding earthquakes, amber alerts, and other situations that may result in societal disruption. In a further example, compromised system information (SI) updates may cause the UE to unnecessarily re-read SI messages. Such problems that may result from interception by malicious observers can be avoided by allowing a BS and UE to respectively encrypt and decrypt the paging information.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as an X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as a macro base station), may include or be referred to as an eNB, gNodeB (gNB), or another type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (such as 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 also may transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, or other IP services.

The base station also may include or be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a paging information component 198 that is configured to receive a paging message from a base station (BS), the paging message including encrypted paging information; decrypt the encrypted paging information to identify paging information; and determine whether to communicate with the BS based on the paging information. The encrypted paging information is decrypted based on information obtained during at least one of a registration procedure or a radio access network (RAN)-based Notification Area Update (RNAU). In other aspects, the base station 102/180 may include a paging component 199 that is configured to encrypt paging information based on information configured during at least one of a registration procedure or a radio access network (RAN)-based Notification Area Update (RNAU); and transmit a paging message to one of a user equipment (UE) or another BS for transmission to the UE, where the paging message includes the encrypted paging information. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), or UCI.

Figure 3:
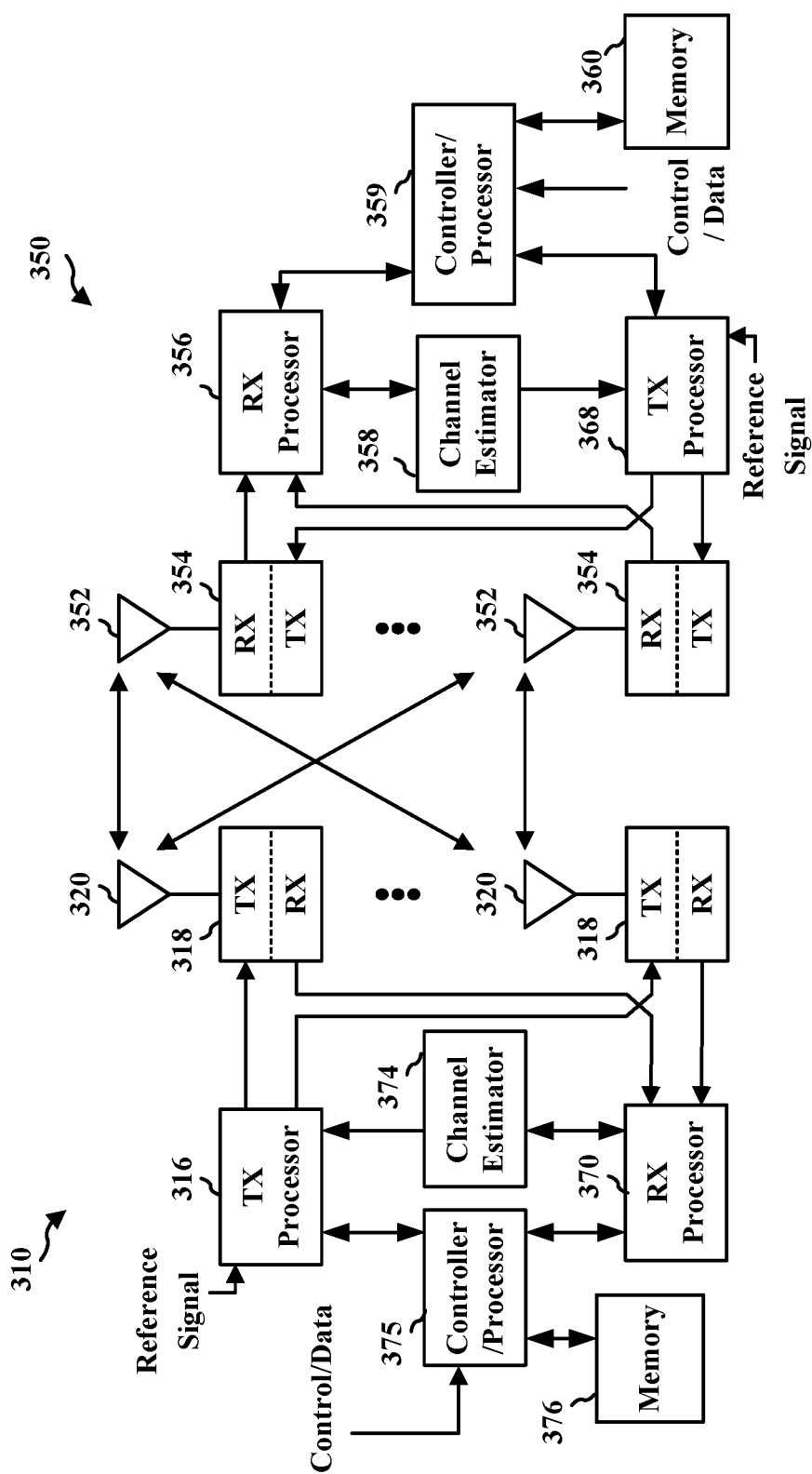
FIG. 3 is a diagram illustrating an example of a base station (BS) and a user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as, pilot) in the time or frequency domain, and combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
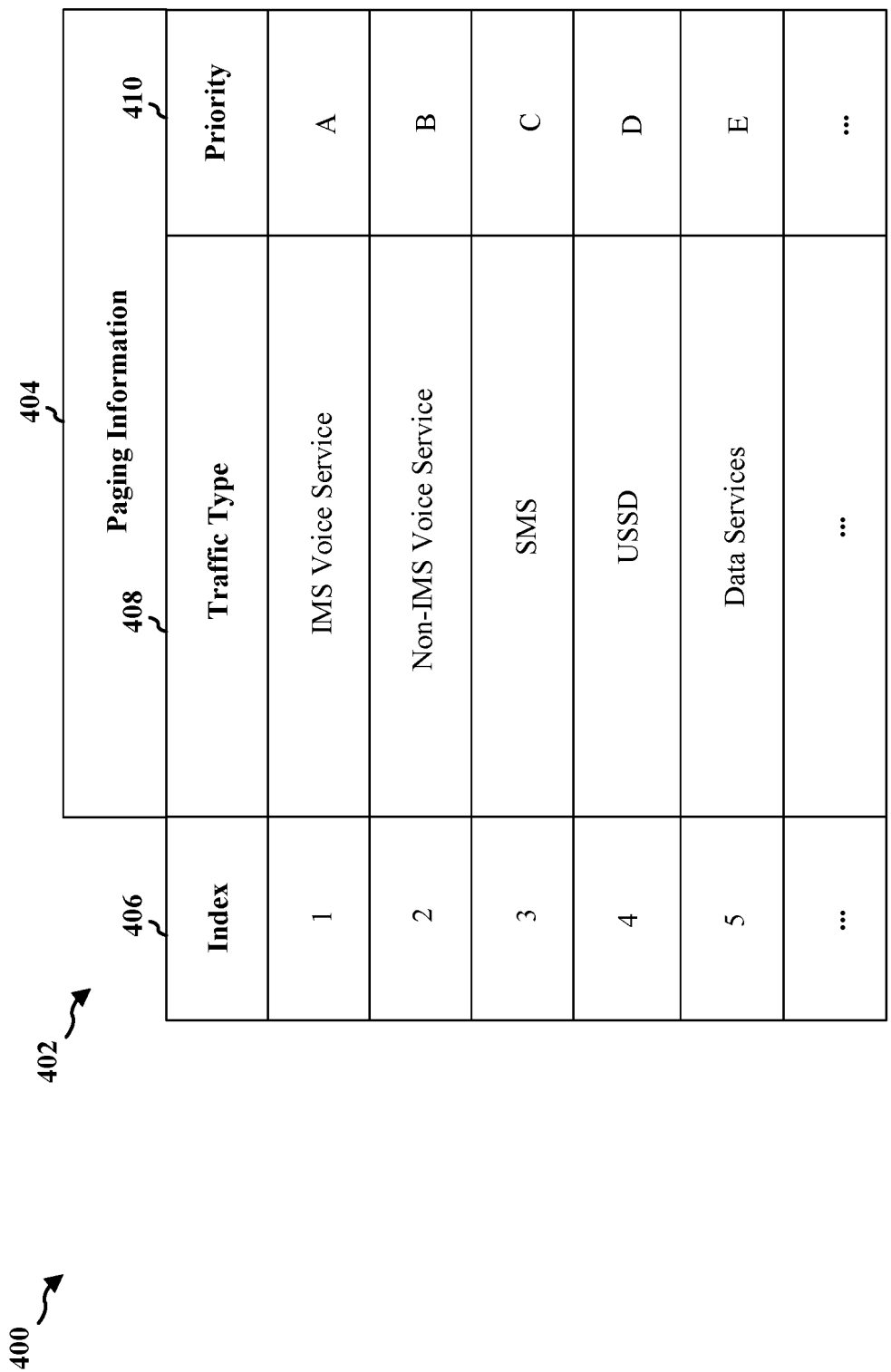
FIG. 4 is a diagram illustrating an example of a mapping between paging information and indices associated with the paging information.

FIG. 4 illustrates an example diagram 400 of a mapping 402 between paging information 404 and indices 406 associated with the paging information. The paging information 404 may include one or more of a traffic type 408 and a priority 410 of the traffic triggering the paging message, and different traffic types/priorities may be associated with different indices. For example, index 1 may identify a paging message triggered by an IMS voice service with a higher priority (identified here as priority "A"), index 2 may identify a paging message triggered by a non-IMS voice service with a lower priority (identified here as priority "B"), index 3 may identify a paging message triggered by an SMS service with an even lower priority (identified here as priority "C") and so forth. Thus, in the example of FIG. 4, a UE that receives a paging message specifying index 1 may determine based on the mapping 402 that the paging message was triggered by a high priority, IMS voice service. On the other hand, a UE that receives a paging message specifying index 5 may determine that the paging message was triggered by a low priority data service.

While diagram 400 illustrates a specific example of the paging information 404 explicitly indicating both the traffic type 408 and the priority 410, the paging information 404 may include only one of these elements. For example, the paging information 404 may include only the traffic type 408, and the UE may determine the priority 410 based on a preconfigured association with the traffic type 408. Alternatively, the paging information 404 may include only the priority 410, and the UE may determine the traffic type 408 based on a preconfigured association with the priority 410. Additionally, the paging information 404 may include other information than traffic type and priority. Moreover, while FIG. 4 illustrates certain traffic types 408 (such as IMS Voice Service, non-IMS voice service, SMS, etc.) associated with certain priorities 410 (such as A, B, C, etc.), the traffic types 408 and priorities 410 are not limited to the illustrated content and arrangement. For instance, other traffic types may be included in addition to or in lieu of the traffic types in FIG. 4, and the traffic types may be arranged to have different priorities than those illustrated. Additionally, the priorities may be numeric values, while the indices 406 may be non-numeric or alphanumeric values.

Figure 5:
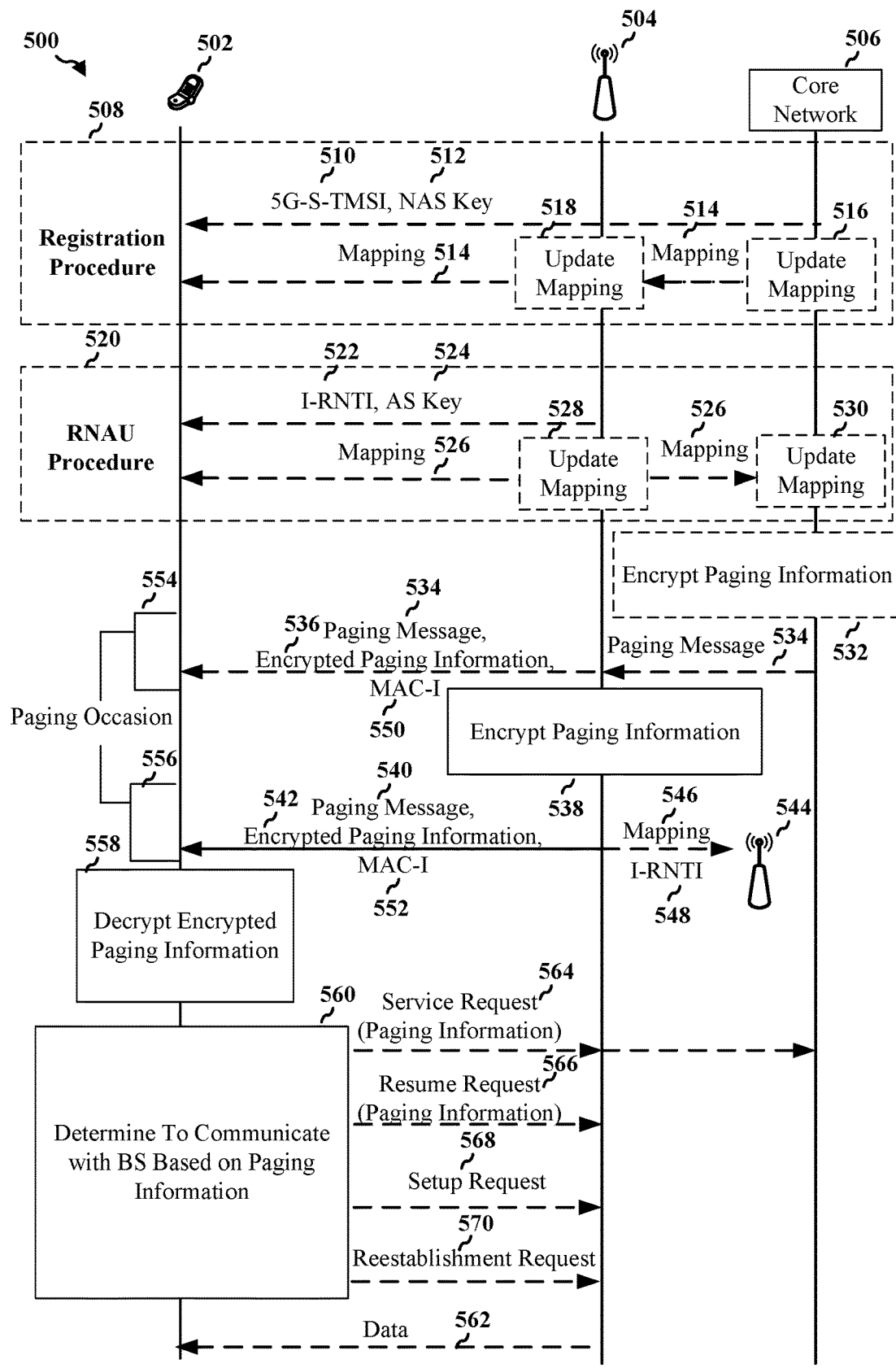
FIG. 5 is a diagram illustrating an example call flow between a UE, a BS, and a core network.

FIG. 5 illustrates a call flow diagram 500 between a UE 502, a base station 504, and a core network. The base station 504 may correspond to a gNB, and the core network 506 may correspond to AMF 192 in FIG. 1. The diagram 500 illustrates the aforementioned examples of encrypting and decrypting paging information in CN-based and RAN-based paging. While FIG. 5 illustrates and describes these examples in the context of NR, they also be applied to LTE and other wireless communication technologies. For instance, the AMF may be replaced by MME 162, and the base station may be replaced by an eNB.

Initially, the UE 502 may perform a registration procedure 508 to connect to the core network 506 and the BS 504. The registration procedure 508 may be performed, for example, when the UE initially registers to the 5G system, when the UE performs a mobility registration update, or when the UE performs a periodic registration update. In the registration procedure, the UE 502 sends a registration request to the BS 504, various signaling may occur between the UE, BS, and AMF including authentication of the UE, and the BS 504 may send a registration accept message to the UE 502 if registration has been accepted. During the registration procedure 508, the core network 506 may allocate and send a 5G-S-TMSI 510 to the UE 502, for example, in the registration accept message to the UE. The 5G-S-TMSI 510 may be a primary 5G-S-TMSI of the UE. Moreover, the core network 506 may generate and send a NAS key 512 to the UE 502, for example, during authentication of the UE and when sending the registration accept message to the UE.

During the registration procedure 508, the core network 506 may provide a mapping 514 between different paging information (such as traffic types or priority) and indices to the UE 502. The mapping 514 may correspond to the mapping 402 in FIG. 4 (including paging information 404 and indices 406), and may be dynamically configured to be different for each UE 502. On initial registration, the core network may initially generate the mapping 514, for example as illustrated in FIG. 4, and send it to the UE for example, in the registration accept message. On subsequent registration procedures, such as during mobility or periodic registration updates, the core network may update the mapping (516) for additional security. In one example, the core network 506 may update or change the association of the indices to the paging information, and may provide the updated association in the mapping 514 to the UE 502. For instance, the mapping may be updated such that index 1 in FIG. 4 no longer corresponds to "A" priority IMS voice service, but to a different traffic type or priority. In another example, the core network 506 may update the indices by scrambling them based on the 5G-S-TMSI 510 of the UE using the NAS key 512. For instance, the mapping may be updated to replace each index with a different value resulting from scrambling the last four bits of the 5G-S-TMSI based on the NAS key. When the core network 506 provides the updated mapping to the base station 504 to be forwarded to the UE 502, the base station 504 may update the mapping (518) at its side to coincide with the mapping of the core network. Alternatively (or additionally), the core network 506 may provide the updated mapping to the BS 504 during CN-based paging of the UE 502. For example, the core network 506 may send the updated mapping to the BS within core network-assisted RAN paging information in the paging message, or in another interface, such as an N1 interface (UE-AMF) or an N2 interface (AMF-BS) message delivery.

If the UE 502 moves out of a configured RAN notification area (RAN), or upon expiration of a periodic RNA update timer, the UE 502 may perform a RNAU procedure 520. In the RNAU procedure, the UE 502 sends an RRC resume request message to the base station 504, various signaling may occur between the UE, the base station 504, the prior base station, and the core network 506 including a security mode command message to the UE, and the BS 504 sends an RRC connection release message to the UE 502. During this procedure (or other procedure involving an RRC connection release), the BS 504 may allocate and send an I-RNTI 522 to the UE 502, for example, in a RRC connection release message to the UE. The I-RNTI 522 may be a primary I-RNTI of the UE. Moreover, the BS 504 may generate and send an AS key 524 to the UE 502, for example, when sending the security mode command message to the UE.

During the RNAU procedure 520, the BS 504 may provide a mapping 526 between different paging information (such as traffic types or priority) and indices to the UE 502. The mapping 526 may correspond to the mapping 402 in FIG. 4 (including paging information 404 and indices 406), and may be dynamically configured to be different for each UE 502. On initial registration, the core network may initially generate the mapping 514, for example as illustrated in FIG. 4, and send it to the BS 504 as described above. On subsequent procedures, for example, during RNAU or other procedures where the UE sends a RRC connection resume request, the BS may update the mapping (528) for additional security. In one example, the BS 504 may update or change the association of the indices to the paging information, and may provide the updated association in the mapping 526 to the UE 502. For instance, the mapping may be updated such that index 1 in FIG. 4 no longer corresponds to "A" priority IMS voice service, but to a different traffic type or priority. In another example, the BS 504 may update the indices by scrambling them based on the I-RNTI 522 of the UE using the AS key 524. For instance, the mapping may be updated to replace each index with a different value resulting from scrambling the last four bits of the I-RNTI based on the AS key. After the BS 504 updates the mapping (528), the base station 504 may provide the updated mapping to the core network 506 to update the mapping (530) at its side to coincide with the mapping of the BS.

When the UE 502 is in an idle mode and a paging cause is triggered (for example, the UE is receiving a IMS voice call), the core network 506 may page the UE 502 during CN-based paging. To provide confidentiality, the core network 506 may encrypt the paging information (532) before sending the paging message 534. As an example, the core network 506 may include an index (such as the index 406) associated with the paging information (such as the paging information 404) which is based on the mapping 514, 526. For instance, the core network 506 may include the index 1 in the paging message 534 to indicate an "A" priority IMS voice call to the UE 502. The mapping 514, 526 may be updated or scrambled for different UEs as described above, and therefore the index may indicate different paging information for different UEs at the same time, or different paging information for the same UE at different times. After encrypting the paging information (532), the core network may send the paging message 534 including the encrypted paging information 536 to the BS 504 to be forwarded to the UE 502. For instance, the BS 504 may send the paging message 534 directly to the UE 502, or to another BS (such as BS 544) for transmission to the UE 502. Additionally, after updating the mapping (516), the core network 506 may provide the updated mapping to the BS 504 in the paging message 534, for example, as core network-assisted RAN paging information.

Similarly, when the UE 502 is in an inactive mode and a paging cause is triggered (for example, the UE is receiving a IMS voice call), the BS 504 may page the UE 502 during RAN-based paging. To provide confidentiality, the BS 504 may encrypt the paging information (538) before sending the paging message 540. As an example, the BS 504 may include an index (such as the index 406) associated with the paging information (such as the paging information 404) which is based on the mapping 514, 526. For instance, the BS 504 may include the index 1 in the paging message 540 to indicate an "A" priority IMS voice call to the UE 502. The mapping 514, 526 may be updated or scrambled for different UEs as described above, and therefore the index may indicate different paging information for different UEs at the same time, or different paging information for the same UE at different times. The mapping also may be received from the core network during paging of the UE, for example, in paging message 534. After encrypting the paging information (538), the BS may send the paging message 540 including the encrypted paging information 542 to the UE 502. For instance, the BS 504 may send the paging message 540 directly to the UE 502, or to another BS (such as BS 544) for transmission to the UE 502. Additionally, after updating the mapping or receiving updated mappings as described above, when the BS 504 pages the cells in the RNA of the UE, the BS also may page cells of neighbor base station(s) 544 within the RNA using, for example, RAN paging over the XnAp interface or other backhaul signaling, and the BS 504 may provide this mapping 546 to the neighbor base station(s) 544 during the backhaul signaling.

While the mapping 514, 526 described above are examples of dynamically configured mappings, the mappings may alternatively be statically configured to include a fixed association of indices (such as indices 406 in FIG. 4) with paging information (such as paging information 404 including the traffic type 408 or priority 410 in FIG. 4). In contrast to dynamic mapping, fixed mapping may include the same index-paging information association for different UEs. Therefore, when encrypting the paging information (532, 538) which triggered the paging message based on a fixed mapping 402, the core network 506 or BS 504 may scramble the index associated with the paging information based on a shared key with the UE 502 to provide increased security for the UE 502. For example, if CN-based paging is triggered, the core network 506 may scramble the index using the NAS key 512, and the encrypted paging information 536 may include this scrambled index. The core network 506 may transmit the paging message 534 with the scrambled index to the UE 502. Similarly, if RAN-based paging is triggered, the BS 504 may scramble the index using the AS key 524, and the encrypted paging information 542 may include this scrambled index. The BS 504 may transmit the paging message 540 with the scrambled index to the UE 502. In either CN-based paging or RAN-based paging, the core network 506 or BS 504 may alternatively or additionally scramble the index based on the UE ID as described above in connection with dynamic mapping.

In CN-based paging, the core network 506 also may encrypt the paging information (532) based on a 5G-S-TMSI of the UE. The core network 506 may associate different 5G-S-TMSI values with different paging information. As an example, the core network 506 may assign S-TMSI 1 for a voice call, S-TMSI 2 for a data message, and so forth. For increased security, the association of the different 5G-S-TMSI values to different paging information may be updated similar to updating the mapping (516), for example, during the registration procedure 508. Based on the associated values, the core network 506 may assign a 5G-S-TMSI of the UE to the paging information which triggered the paging message. For example, if the UE is being paged for a voice call, the core network 506 may assign S-TMSI 1 and include that value as encrypted paging information 536 in the paging message 534. The assigned 5G-S-TMSI may be the same as, or different than, the primary 5G-S-TMSI 510 of the UE used in RRC connection establishment requests. Alternatively, rather than explicitly signaling the assigned 5G-S-TMSI in the encrypted paging information 536, the core network 506 may signal a single 5G-S-TMSI to the UE 502 along with an offset, and the UE may derive the assigned 5G-S-TMSI from the signaled value and offset. For example, to indicate a voice call, rather than explicitly signaling S-TMSI 1, the core network may signal a S-TMSI of 0 and an offset of 1, which the UE may add together to arrive at the assigned 5G-S-TMSI.

Similarly, in RAN-based paging, the BS 504 also may encrypt the paging information (538) based on an I-RNTI of the UE. The BS 504 may associate different I-RNTI values with different paging information. As an example, the BS 504 may assign I-RNTI 1 for a voice call, I-RNTI 2 for a data message, and so forth. For increased security, the association of the different I-RNTI values to different paging information may be updated similar to updating the mapping (528), for example, during the RNAU procedure 520. Based on the associated values, the BS 504 may assign an I-RNTI of the UE to the paging information which triggered the paging message. For example, if the UE is being paged for a voice call, the BS 504 may assign I-RNTI 1 and include that value as encrypted paging information 542 in the paging message 540. The assigned I-RNTI may be the same as, or different than, the primary I-RNTI 522 of the UE used in RRC connection resume requests. Alternatively, rather than explicitly signaling the assigned I-RNTI in the encrypted paging information 542, the BS 504 may signal a single I-RNTI to the UE 502 along with an offset, and the UE may derive the assigned I-RNTI from the signaled value and offset. For example, to indicate a voice call, rather than explicitly signaling I-RNTI 1, the BS may signal an I-RNTI of 0 and an offset of 1, which the UE may add together to arrive at the assigned I-RNTI. Additionally, when the BS 504 pages the cells in the RNA of the UE, the BS also may page cells of neighbor base station(s) 544 within the RNA using, for example, RAN paging over the XnAp interface or other backhaul signaling, and the BS 504 may provide the assigned I-RNTI 548 to the neighbor base station(s) 544 during the backhaul signaling.

The paging message 534, 540 may be further encrypted using integrity protection. In CN-based paging or RAN-based paging, when encrypting the paging information (532, 538), the BS 504 may include integrity protection code to protect the integrity of the paging message obtained from the core network 506. The integrity protection code may include, for example, a MAC-I 550, 552. To generate the MAC-I, the BS 504 scrambles the paging information based on a shared key between the UE and the BS. For example, the key may be derived from the AS key 524 transmitted to the UE 502 in the RNAU procedure 520, or the key may be obtained and updated in response to a RRC connection re-establishment request. After generating the MAC-I 550, 552, the BS 504 appends the MAC-I to the paging message 534, 540, and transmits the paging message to the UE 502.

The UE 502 monitors for paging occasions (POs) each DRX cycle. Based on the UE's primary 5G-S-TMSI 510, the UE 502 may determine the time at which it can monitor for a PO, and the UE 502 may configure its DRX cycles accordingly. In one example, the UE may determine a paging frame, which may contain one or more POs, based on the following calculated UE ID parameter: 5G-S-TMSI mod 1024. Based on this calculation, the UE 502 may identify the POs and time its DRX cycles to receive paging messages from the BS 504 during those POs.

As illustrated in FIG. 5, the UE 502 may receive CN-based paging (such as the paging message 534) from the BS 504 (or another BS) in a PO 554, or RAN-based paging (such as the paging message 540) from the BS 504 (or another BS) in a PO 556. The paging message 534, 540 includes the encrypted paging information 536, 542 and the UE 502 may decrypt the encrypted paging information (558) to identify the paging information which triggered the message. In one example, if dynamic mapping is used for the encryption, the encrypted paging information may include an index (such as the index 406 in FIG. 4) associated with a corresponding paging information (such as the paging information 404 in FIG. 4), and the UE 502 may identify the paging information based on the mapping 514, 526 received from the BS 504. For example, if the index is 1, the UE may identify the paging information as corresponding to A priority IMS voice service from the mapping 514, 526. The UE 502 may receive the mapping 514, 526 when registering with the BS 504 (such as in registration procedure 508), or when providing an update to the BS 504 (for example, in RNAU procedure 520). The core network 506 or BS 504 may update the mapping (516, 518, 528, 530) before the UE 502 receives the mapping 514, 526 during the registration procedure 508 or RNAU procedure 520. For example, the core network 506 or BS 504 may change the index-paging information association illustrated in the mapping 402 of FIG. 4. Moreover, the core network 506 may update the mapping (516) based on the 5G-S-TMSI 510 of the UE 502, and the BS 504 may update the mapping (526) based on the I-RNTI 522 of the UE 502.

In another example, if a fixed mapping is used for the encryption, the encrypted paging information 536, 542 may include an index (such as the index 406 in FIG. 4) associated with a corresponding paging information (such as the paging information 404 in FIG. 4) which is scrambled based on a shared key between the UE 502 and the BS 504. In CN-based paging, the shared key may be the NAS key 512 which the UE 502 receives from the core network 506. In RAN-based paging, the shared key may be the AS key 524 which the UE 502 receives from the BS 504. The UE may decrypt the encrypted paging information (558) based on the mapping 402 and the shared key to identify the paging information. For example, if the index is 1 and is scrambled using the NAS key 512 or AS key 524, the UE may identify the paging information as corresponding to "A priority IMS voice service" from the mapping 402 by unscrambling the index using the corresponding key.

In a further example, if different 5G-S-TMSI values are used for the encryption in CN-based paging, the encrypted paging information 536 may include a 5G-S-TMSI value associated with the UE 502 and corresponding to a specific paging information. The UE may decrypt the encrypted paging information (558) to identify the paging information based on the associated 5G-S-TMSI value. For example, the core network 506 may assign S-TMSI 1 for voice calls, S-TMSI 2 for data messages, and so forth. This mapping may be preconfigured by the core network 506, or may be dynamically configured for the UE. For instance, the UE may receive this mapping during registration procedure 508. If the encrypted paging information 536 explicitly includes S-TMSI 1, the UE 502 may identify that a voice call is triggering the paging message 534 based on the value of the S-TMSI. Alternatively, the encrypted paging information 536 may include only a single 5G-S-TMSI, and the UE may modify the signaled TMSI and identify the paging information based on the modified TMSI. For instance, if the encrypted paging information 536 only includes S-TMSI 0 and an offset of 1, the UE may modify the TMSI value (0) by adding the offset (1) to arrive at the associated S-TMSI value corresponding to the triggered paging message (S-TMSI 1).

In another example, if different I-RNTI values are used for the encryption in RAN-based paging, the encrypted paging information 542 may include an I-RNTI value associated with the UE 502 and corresponding to a specific paging information. The UE may decrypt the encrypted paging information (558) to identify the paging information based on the associated I-RNTI value. For example, the BS 504 may assign I-RNTI 1 for voice calls, I-RNTI 2 for data messages, and so forth. This mapping may be preconfigured by the BS 504, or may be dynamically configured for the UE. For instance, the UE may receive this mapping during RNAU procedure 520. If the encrypted paging information 542 explicitly includes I-RNTI 1, the UE 502 may identify that a voice call is triggering the paging message 534 based on the value of the I-RNTI. Alternatively, the encrypted paging information 542 may include only a single I-RNTI, and the UE may modify the signaled RNTI and identify the paging information based on the modified RNTI. For instance, if the encrypted paging information 542 only includes I-RNTI 0 and an offset of 1, the UE may modify the RNTI value (0) by adding the offset (1) to arrive at the associated I-RNTI value corresponding to the triggered paging message (I-RNTI 1).

Additionally, the paging message 534, 540 may include integrity protection code for the paging information. The integrity protection code may include MAC-I 550, 552. When the UE 502 receives the paging message 534, 540 including the MAC-I, the UE may decrypt the encrypted paging information (558) after verifying the integrity protection code. In some implementations, the UE 502 may generate a code based on the paging information. The generated code may be an expected MAC-I, which the UE may calculate based on the paging message including the paging information. The UE may descramble the integrity protection code received in the paging message 534, 540 (such as the MAC-I 550, 552), based on a key shared between the UE 502 and the BS 504. The key may be derived from the AS key 524 received during the RNAU procedure 520, or the key may be obtained and updated whenever the UE sends an RRC connection re-establishment request. After the MAC-I is descrambled, the UE 502 compares the generated code (such as the expected MAC-I) to the descrambled MAC-I. If there is a match, the integrity of the paging message 534, 540 is verified and the UE 502 can identify the paging information from the encrypted paging information 536, 542 as described above. If there is a mismatch, the integrity of the paging message is compromised, and the UE 502 discards the paging message.

After the UE 502 decrypts the encrypted paging information (558), the UE 502 determines whether to communicate with the BS 504 based on the paging information (560). As described above, the UE may be a MUSIM UE which is actively communicating using a first USIM, while monitoring for paging messages using the second USIM. Therefore, when the UE 502 receives the paging messages 534, 540, the UE may determine whether to suspend the connection of the first USIM and establish the connection of the second USIM based on the identified paging information. For instance, if the UE 502 determines that the paging information (such as the paging information 404 in FIG. 4) is a higher priority IMS voice call, the UE may possibly determine to accept the call and subsequently receive downlink data 562 from the BS 504. However, if the UE 502 determines that the paging information is a lower priority data message, the UE may possibly determine to reject the call and refrain from communicating with the BS 504.

If the UE 502 determines to communicate with the BS 504 based on the paging information (560), the UE 502 may submit one or more requests during the transition from the idle or inactive mode to the connected mode. In one example, when the UE is in the idle mode when it is paged, the UE 502 may send a service request 564 to the BS 504 to be forwarded to the core network 506 in response to the paging message 534. In another example, when the UE is in the inactive mode when it is paged, the UE 502 may send a resume request 566 to the BS 504 in response to the paging message 540. When sending the service request 564 in response to CN-based paging, or the resume request 566 in response to RAN-based paging, the UE 502 may include in the request 564, 566 the paging information (such as the traffic type or priority triggering the paging message). Based on the paging information, the BS 504 or core network 506 may confirm that the service request or resume request correspond to the paging which triggered the paging message 534, 540 sent to the UE 502. For additional security, the UE 502 may encrypt the paging information in the service request 564 or the resume request 566 using any of the examples described above in encrypting the paging information (532, 538). Similarly, the UE 502 may integrity protect the service request 564 or the resume request 566 using a MAC-I as described above. For example, when the UE responds with a resume request, the UE may calculate the MAC-I associated with the request (such as shortResumeMAC-I or another name) using the encrypted paging information.

In a further example, the UE 502 may send a RRC connection establishment request 568 or an RRC connection re-establishment request 570 to the BS 504 in response to CN-based paging. The UE may send the RRC connection establishment request 568 or RRC connection re-establishment request 570 when transitioning from the idle mode to the connected mode after determining to communicate with the BS based on the paging information (560). The UE 502 may include its primary 5G-S-TMSI 510 in either request 568, 570. Similarly, when the UE 502 sends the resume request 566 to the BS 504 in response to RAN-based paging, the UE 502 may include its primary I-RNTI 522 in the request.

Figure 6:
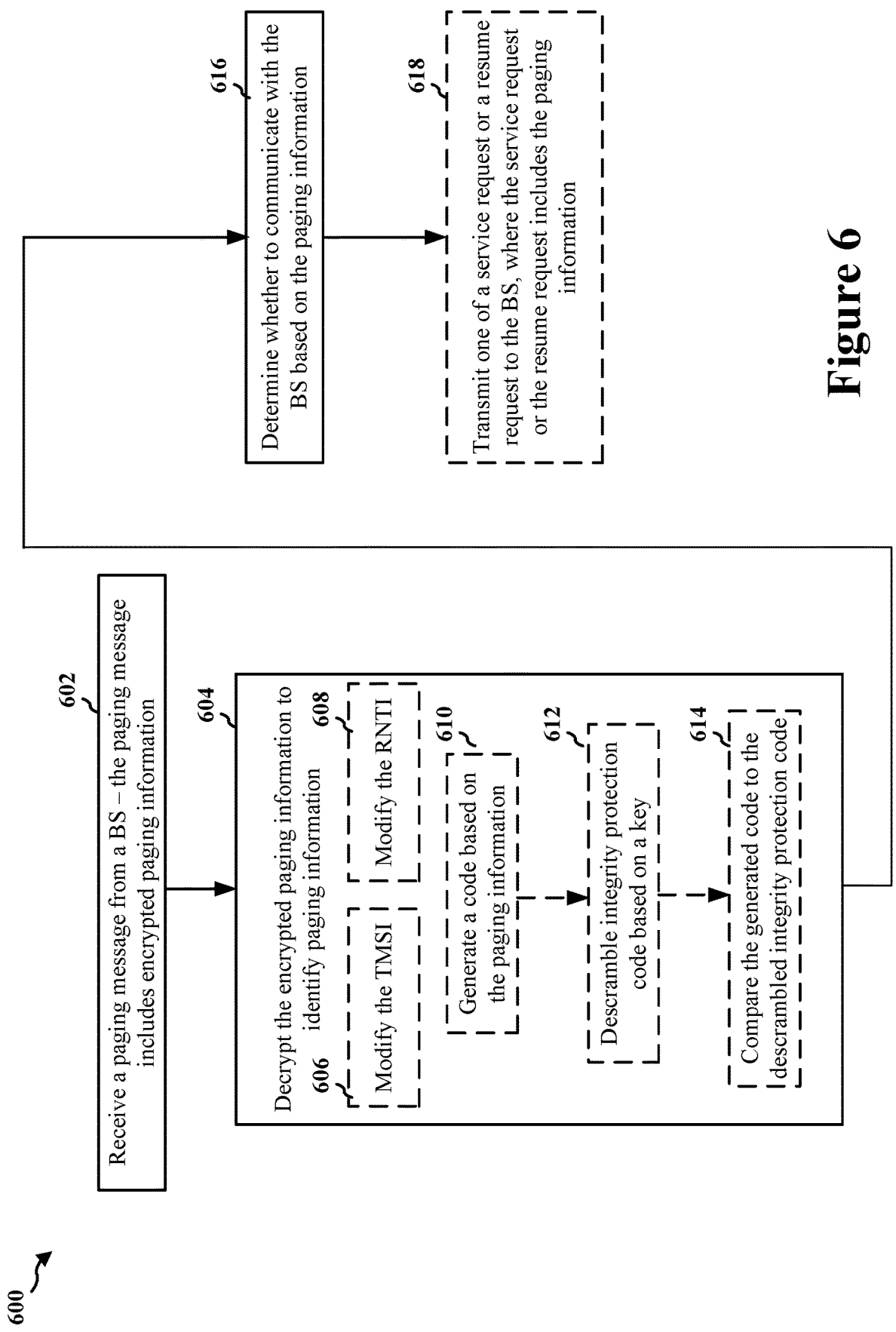
FIG. 6 is a flowchart of a method of wireless communication at an apparatus of a UE.

FIG. 6 is a flowchart 600 of a method of wireless communication. The method may be performed by a UE (such as the UE 104, 350, 502, 1050; the apparatus 702/702'; the processing system 814, which may include the memory 360 and which may be the entire UE 350 or a component of the UE 350, such as the TX processor 368, the RX processor 356, or the controller/processor 359). Optional aspects are included in dashed lines. The method allows a UE to decrypt paging information encrypted by a core network or a base station, thereby providing confidentiality to the UE's paging information and improving user privacy.

At 602, the UE receives a paging message from a base station (BS). The paging message includes encrypted paging information. For example, 602 may be performed by reception component 704 and paging message component 706 in FIG. 7. The paging information may include at least one of traffic type or priority. For instance, referring to FIG. 5, the UE 502 may receive CN-based paging (such as the paging message 534) from the BS 504 in a PO 554, or RAN-based paging (such as the paging message 540) from the BS 504 in a PO 556. The paging message 534, 540 includes the encrypted paging information 536, 542 and the UE 502 may decrypt the encrypted paging information (558) to identify the paging information which triggered the message.

A paging occasion for receiving the paging message may be determined based on a primary TMSI of the UE. For instance, referring to FIG. 5, the UE 502 monitors for paging occasions (POs) each DRX cycle. Based on the UE's primary 5G-S-TMSI 510, the UE 502 may determine the time at which it can monitor for a PO, and the UE 502 may configure its DRX cycles accordingly. In one example, the UE may determine a paging frame, which may contain one or more POs, based on the following calculated UE ID parameter: 5G-S-TMSI mod 1024. Based on this calculation, the UE may identify the POs and time its DRX cycles to receive paging messages from the BS 504 during those POs.

At 604, the UE decrypts the encrypted paging information to identify paging information. For example, 604 may be performed by decryption component 708 in FIG. 7. The encrypted paging information is decrypted based on information obtained during at least one of a registration procedure or a RNAU. In one example, the information includes a mapping between different paging information and indices associated with the different paging information. For instance, referring to FIGS. 4 and 5, during registration procedure 508 or RNAU procedure 520, the UE 502 may obtain mapping 402, 514, 526 between the paging information 404 and indices 406 associated with the paging information. In another example, the information further includes an updated mapping between the different paging information and the indices associated with the different paging information. For instance, referring to FIGS. 4 and 5, during registration procedure 508 or RNAU procedure 520, the UE 502 may obtain the mapping 402, 514, 526 between the paging information 404 and indices 406 associated with the paging information after the mapping is updated (516, 518, 528, 530) by the base station 504 or the core network 506. In another example, the information includes an association of different TMSI with different paging information. For instance, referring to FIGS. 4 and 5, the UE 502 may obtain during registration procedure 508 an association of different TMSI, including 5G-S-TMSI 510, with different ones of the paging information 404. In another example, the information further includes an offset for TMSI. For instance, referring to FIG. 5, the UE 502 may obtain an offset for the 5G-S-TMSI 510 in the encrypted paging information 536. In another example, the information includes an association of different RNTI with different paging information. For instance, referring to FIGS. 4 and 5, the UE 502 may obtain during RNAU procedure 520 an association of different RNTI, including I-RNTI 522, with different ones of the paging information 404. In another example, the information further includes an offset for RNTI. For instance, referring to FIG. 5, the UE 502 may obtain an offset for the I-RNTI 522 in the encrypted paging information 542. In another example, the information includes a primary RNTI of the UE.

In one example, the encrypted paging information includes an index associated with the paging information, the information includes the mapping between the different paging information and the indices associated with the different paging information, and the encrypted paging information is decrypted based on the mapping. The mapping may be received during the registration procedure. The information also may further include the updated mapping between the different paging information and the indices associated with the different paging information, and the updated mapping also may be received during the registration procedure, received during a radio access network (RAN)-based Notification Area Update (RNAU), or based on an identifier of the UE. For instance, referring to FIG. 5, the UE 502 may decrypt the encrypted paging information (558) to identify the paging information which triggered the message. In one example, if dynamic mapping is used for the encryption, the encrypted paging information may include an index (such as the index 406 in FIG. 4) associated with a corresponding paging information (such as the paging information 404 in FIG. 4), and the UE 502 may identify the paging information based on the mapping 514, 526 received from the BS 504. For example, if the index is 1, the UE may identify the paging information as corresponding to A priority IMS voice service from the mapping 514, 526. The UE 502 may receive the mapping 514, 526 when registering with the BS 504 (such as in registration procedure 508), or when providing an update to the BS 504 (for example, in RNAU procedure 520). The core network 506 or BS 504 may update the mapping (516, 518, 528, 530) before the UE 502 receives the mapping 514, 526 during the registration procedure 508 or RNAU procedure 520. For example, the core network 506 or BS 504 may change the index-paging information association illustrated in the mapping 402 of FIG. 4. Moreover, the core network 506 may update the mapping (516) based on the 5G-S-TMSI 510 of the UE 502, and the BS 504 may update the mapping (526) based on the I-RNTI 522 of the UE 502.

In another example, the mapping includes a fixed mapping, and the index is scrambled based on a shared key between the UE and the BS. The shared key may include one of a non-access stratum (NAS) ciphering key or an access stratum (AS) ciphering key. The UE may decrypt the encrypted paging information at 604 based on the shared key. For instance, referring to FIG. 5, if a fixed mapping is used for the encryption, the encrypted paging information 536, 542 may include an index (such as index 406 in FIG. 4) associated with a corresponding paging information (such as paging information 404 in FIG. 4) which is scrambled based on a shared key between the UE 502 and the BS 504. In CN-based paging, the shared key may be the NAS key 512 which the UE 502 receives from the core network 506. In RAN-based paging, the shared key may be the AS key 524 which the UE 502 receives from the BS 504. The UE may decrypt the encrypted paging information (558) based on the mapping 402 and the shared key to identify the paging information. For example, if the index is 1 and is scrambled using the NAS key 512 or AS key 524, the UE may identify the paging information as corresponding to "A priority IMS voice service" from the mapping 402 by unscrambling the index using the corresponding key.

In a further example, the encrypted paging information includes a temporary mobile subscriber identifier (TMSI) associated with the UE, where the information includes the association of different TMSI with the different paging information, and the encrypted paging information is decrypted at 604 based on the association. For instance, at 606, the information also may further include the offset for the TMSI, and the UE may modify the TMSI based on the offset when decrypting the encrypted paging information to identify the paging information. For example, 606 may be performed by modification component 710 in FIG. 7. For instance, referring to FIG. 5, if different 5G-S-TMSI values are used for the encryption in CN-based paging, the encrypted paging information 536 may include a 5G-S-TMSI value associated with the UE 502 and corresponding to a specific paging information. The UE may decrypt the encrypted paging information (558) to identify the paging information based on the associated 5G-S-TMSI value. For example, the core network 506 may assign S-TMSI 1 for voice calls, S-TMSI 2 for data calls, and so forth. This mapping may be preconfigured by the core network 506, or may be dynamically configured for the UE. For instance, the UE may receive this mapping during registration procedure 508. If the encrypted paging information 536 explicitly includes S-TMSI 1, the UE 502 may identify that a voice call is triggering the paging message 534 based on the value of the S-TMSI. Alternatively, the encrypted paging information 536 may include only a single 5G-S-TMSI, and the UE may modify the signaled TMSI and identify the paging information based on the modified TMSI. For instance, if the encrypted paging information 536 only includes S-TMSI 0 and an offset of 1, the UE may modify the TMSI value (0) by adding the offset (1) to arrive at the associated S-TMSI value corresponding to the triggered paging message (S-TMSI 1).

In another example, the encrypted paging information includes a radio network temporary identifier (RNTI) associated with the UE, where the information includes the association of the different RNTI with the different paging information, and the encrypted paging information is decrypted at 604 based on the association. For instance, at 608, the information may further include the offset for the RNTI, and the UE may modify the RNTI based on the offset when decrypting the encrypted paging information to identify the paging information. For example, 608 may be performed by modification component 710 in FIG. 7. For instance, referring to FIG. 5, if different I-RNTI values are used for the encryption in RAN-based paging, the encrypted paging information 542 may include an I-RNTI value associated with the UE 502 and corresponding to a specific paging information. The UE may decrypt the encrypted paging information (558) to identify the paging information based on the associated I-RNTI value. For example, the BS 504 may assign I-RNTI 1 for voice calls, I-RNTI 2 for data calls, and so forth. This mapping may be preconfigured by the BS 504, or may be dynamically configured for the UE. For instance, the UE may receive this mapping during RNAU procedure 520. If the encrypted paging information 542 explicitly includes I-RNTI 1, the UE 502 may identify that a voice call is triggering the paging message 534 based on the value of the I-RNTI. Alternatively, the encrypted paging information 542 may include only a single I-RNTI, and the UE may modify the signaled RNTI and identify the paging information based on the modified RNTI. For instance, if the encrypted paging information 542 only includes I-RNTI 0 and an offset of 1, the UE may modify the RNTI value (0) by adding the offset (1) to arrive at the associated I-RNTI value corresponding to the triggered paging message (I-RNTI 1).

In an additional example, the paging message includes integrity protection code for the paging information, and the UE may decrypt the encrypted paging information at 604 after confirming the integrity of the paging message. The integrity protection code may include a Message Authentication Code-Integrity (MAC-I). For instance, at 610, the UE generates a code based on the paging information. For example, 610 may be performed by code generation component 712 in FIG. 7. Then, at 612, the UE descrambles the integrity protection code based on a key. For example, 612 may be performed by key component 714 in FIG. 7. Lastly, at 614, the UE compares the generated code to the descrambled integrity protection code. For example, 614 may be performed by match component 716 in FIG. 7. For instance, referring to FIG. 5, the paging message 534, 540 may include integrity protection code for the paging information. The integrity protection code may include MAC-I 550, 552. When the UE 502 receives the paging message 534, 540 including the MAC-I, the UE may decrypt the encrypted paging information (558) after verifying the integrity protection code. In operation, the UE 502 may generate a code based on the paging information. The generated code may be an expected MAC-I, which the UE may calculate based on the paging message including the paging information. The UE may descramble the integrity protection code received in the paging message 534, 540 (such as the MAC-I 550, 552), based on a key shared between the UE 502 and the BS 504. The key may be derived from the AS key 524 received during the RNAU procedure 520, or the key may be obtained and updated whenever the UE sends an RRC connection re-establishment request. After the MAC-I is descrambled, the UE 502 compares the generated code (such as the expected MAC-I) to the descrambled MAC-I. If there is a match, the integrity of the paging message 534, 540 is verified and the UE 502 can identify the paging information from the encrypted paging information 536, 542 as described above. If there is a mismatch, the integrity of the paging message is compromised, and the UE 502 discards the paging message.

At 616, the UE determines whether to communicate with the BS based on the paging information. For example, 616 may be performed by determination component 718 in FIG. 7. For instance, referring to FIG. 5, after the UE 502 decrypts the encrypted paging information (558), the UE 502 determines whether to communicate with the BS 504 based on the paging information (560). As described above, the UE may be a MUSIM UE which is actively communicating using a first USIM, while monitoring for paging messages using the second USIM. Therefore, when the UE 502 receives the paging messages 534, 540, the UE may determine whether to suspend the connection of the first USIM and establish the connection of the second USIM based on the identified paging information. For instance, if the UE 502 determines that the paging information (such as paging information 404 in FIG. 4) is a higher priority IMS voice call, the UE may possibly determine to accept the call and subsequently receive downlink data 562 from the BS 504. However, if the UE 502 determines that the paging information is a lower priority data message, the UE may possibly determine to reject the call and refrain from communicating with the BS 504.

At 618, the UE may transmit one of a service request or a resume request to the BS, where the one of the service request or the resume request includes the paging information. For example, 618 may be performed by request component 722 and transmission component 720 in FIG. 7. The paging information in the one of the service request or the resume request may be encrypted. Moreover, the one of the service request or the resume request may be integrity protected. For instance, referring to FIG. 5, if the UE 502 determines to communicate with the BS 504 based on the paging information (560), the UE 502 may submit one or more requests during the transition from the idle or inactive mode to the connected mode. In one example, when the UE is in the idle mode when it is paged, the UE 502 may send a service request 564 to the BS 504 to be forwarded to the core network 506 in response to the paging message 534. In another example, when the UE is in the inactive mode when it is paged, the UE 502 may send a resume request 566 to the BS 504 in response to the paging message 540. When sending the service request 564 in response to CN-based paging, or the resume request 566 in response to RAN-based paging, the UE 502 may include in the request 564, 566 the paging information (such as the traffic type or priority triggering the paging message). Based on the paging information, the BS 504 or core network 506 may confirm that the service request or resume request correspond to the paging which triggered the paging message 534, 540 sent to the UE 502. For additional security, the UE 502 may encrypt the paging information in the service request 564 or the resume request 566 using any of the examples described above in encrypting the paging information (532, 538). Similarly, the UE 502 may integrity protect the service request 564 or the resume request 566 using a MAC-I as described above.

A primary TMSI may be transmitted in one of a Radio Resource Control (RRC) Connection Request or a RRC Connection Re-establishment Request to the BS. Similarly, a primary RNTI of the UE also may be transmitted in a Radio Resource Control (RRC) Connection Resume Request to the BS. For instance, referring to FIG. 5, the UE 502 may send a RRC connection establishment request 568 or an RRC connection re-establishment request 570 to the BS 504 in response to CN-based paging. The UE may send the RRC connection establishment request 568 or RRC connection re-establishment request 570 when transitioning from the idle mode to the connected mode after determining to communicate with the BS based on the paging information (560). The UE 502 may include its primary 5G-S-TMSI 510 in either request 568, 570. Similarly, when the UE 502 sends the resume request 566 to the BS 504 in response to RAN-based paging, the UE 502 may include its primary I-RNTI 522 in the request.

Figure 7:
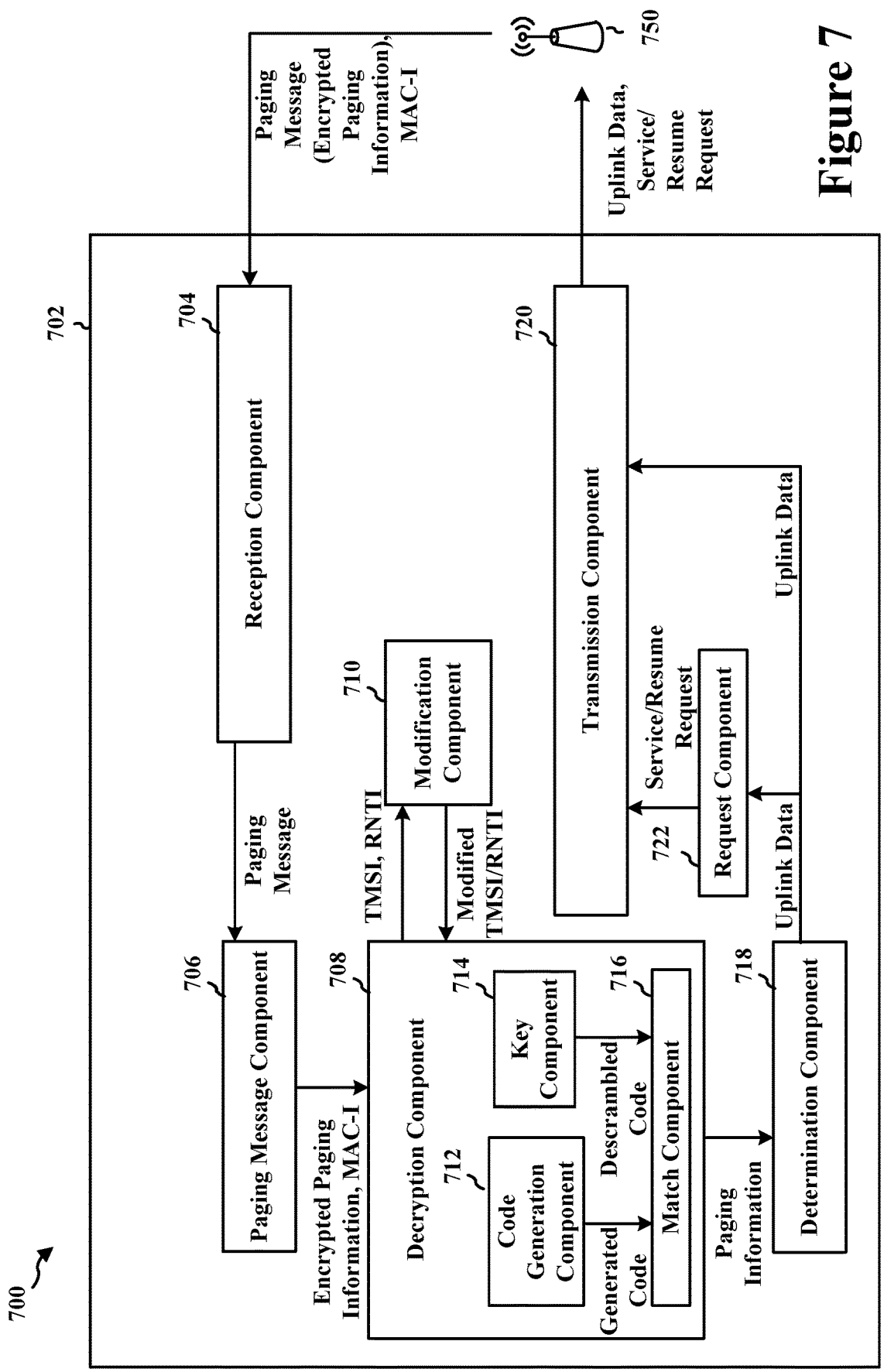
FIG. 7 is a conceptual data flow diagram illustrating the data flow between different means and components in an example apparatus.

FIG. 7 is a conceptual data flow diagram 700 illustrating the data flow between different means/components in an example apparatus 702. The apparatus may be a UE (such as the UE 104, 350, 502, 1050). The apparatus includes a reception component 704 that receives a paging message from a BS 750 (such as the BS 102/180, 310, 504), for example, as described in connection with 602 in FIG. 6. The paging message includes encrypted paging information, and may be received in CN-based or RAN-based paging. The apparatus includes a paging message component 706 that receives, via the reception component 704, the paging message from the BS including the encrypted paging information, for example, as described in connection with 602 in FIG. 6.

The apparatus includes a decryption component 708 that decrypts the encrypted paging information to identify paging information, for example, as described in connection with 604 in FIG. 6. The encrypted paging information is decrypted based on information obtained during at least one of a registration procedure or a RNAU. In one example, the encrypted paging information includes an index associated with the paging information, the information includes a mapping between different paging information and indices associated with the different paging information, and the decryption component 708 may decrypt the encrypted paging information based on the mapping. In another example, the encrypted paging information includes a TMSI associated with the UE, the information includes an association of different TMSI with different paging information, and the encrypted paging information is decrypted based on the association. In another example, the information further includes an offset, the apparatus includes a modification component 710 that may modify the TMSI based on the offset, for example, as described in connection with 606 in FIG. 6, and the decryption component 708 may identify the paging information based on the modified TMSI. In another example, the encrypted paging information includes a RNTI associated with the UE, the information includes an association of different RNTI with different paging information, and the encrypted paging information is decrypted based on the association. In another example, the information further includes an offset, the modification component 710 may modify the RNTI based on the offset, for example, as described in connection with 608 in FIG. 6, and the decryption component 708 may identify the paging information based on the modified RNTI.

The paging message also may include integrity protection code for the paging information, and the decryption component 708 may decrypt the encrypted paging information after confirming the integrity of the paging message. The integrity protection code includes a MAC-I. The apparatus includes a code generation component 712 that generates a code based on the paging information, for example, as described in connection with 610 in FIG. 6. The apparatus includes a key component 714 that descrambles the integrity protection code based on a key, for example, as described in connection with 612 in FIG. 6. The apparatus includes a match component 716 that compares the generated code to the descrambled integrity protection code, for example, as described in connection with 614 in FIG. 6.

The apparatus includes a determination component 718 that determines whether to communicate with the BS based on the paging information, for example, as described in connection with 616 in FIG. 6. The apparatus includes a transmission component 720 that transmits uplink data to the BS 750, for example, in response to the determination component 718 determining to communicate with the BS based on the paging information. The apparatus further includes a request component 722 that transmits, via the transmission component 720, one of a service request or a resume request to the BS, for example, as described in connection with 618 in FIG. 6. The service request or the resume request may include the paging information.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
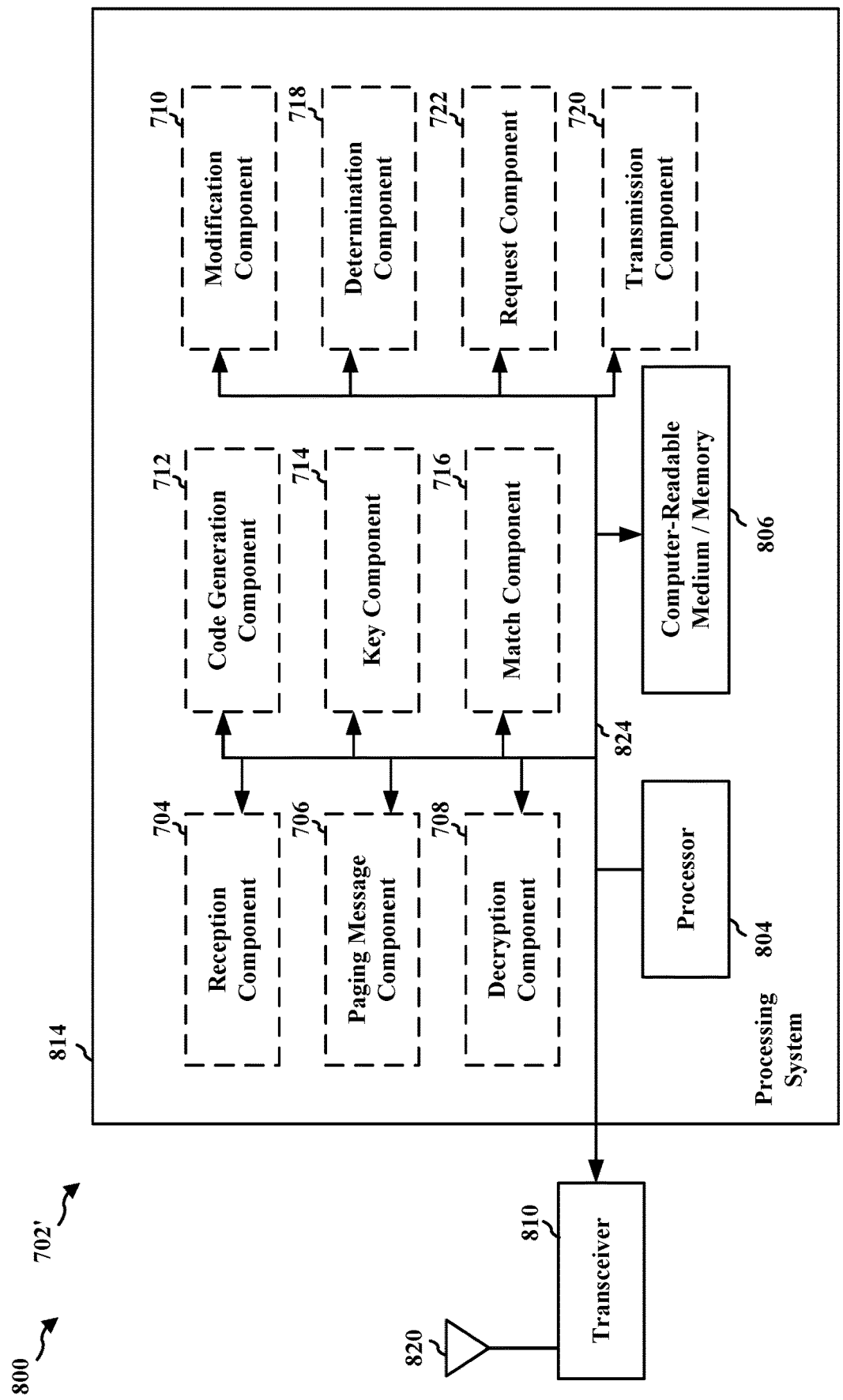
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors or hardware components, represented by the processor 804, the components 704, 706, 708, 710, 712, 714, 716, 718, 720, 722 and the computer-readable medium/memory 806. The bus 824 also may link various other circuits such as timing sources, peripherals, voltage regulators, and power management circuits.

The processing system 814 may be coupled to an interface such as a transceiver 810 that is configured to obtain a paging message from a BS. The transceiver 810 is coupled to one or more antennas 820. The transceiver 810 provides a means for communicating with various other apparatus over a transmission medium. The transceiver 810 receives or obtains a signal from the one or more antennas 820, extracts information from the received signal, and provides the extracted information to the processing system 814, specifically the reception component 704. In addition, the transceiver 810 receives information from the processing system 814, specifically the transmission component 720, and based on the received information, generates a signal to be applied to the one or more antennas 820 which is output for transmission. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described above for any particular apparatus. The computer-readable medium/memory 806 also may be used for storing data that is manipulated by the processor 804 when executing software. The processing system 814 further includes at least one of the components 704, 706, 708, 710, 712, 714, 716, 718, 720, 722. The components may be software components running in the processor 804, resident/stored in the computer readable medium/memory 806, one or more hardware components coupled to the processor 804, or some combination thereof. The processing system 814 may be a component of the UE 350 and may include the memory 360 or at least one of the TX processor 368, the RX processor 356, and the controller/processor 359. Alternatively, the processing system 814 may be the entire UE (such as UE 350 of FIG. 3).

In one configuration, the apparatus 702/702' for wireless communication includes means for receiving a paging message from a base station (BS). The paging message includes encrypted paging information. The apparatus further includes means for decrypting the encrypted paging information to identify paging information, where the encrypted paging information is decrypted based on information obtained during at least one of a registration procedure or a RNAU. The apparatus further includes means for determining whether to communicate with the BS based on the paging information.

In one configuration, the encrypted paging information may include an index associated with the paging information. The information includes a mapping between different paging information and indices associated with the different paging information, and the encrypted paging information may be decrypted based on the mapping.

In one configuration, the mapping may include a fixed mapping. The index may be scrambled based on a shared key between the UE and the BS.

In one configuration, the encrypted paging information may include a temporary mobile subscriber identifier (TMSI) associated with the UE. The information may include an association of different TMSI with different paging information. The encrypted paging information may be decrypted based on the association. The information may further include an offset, and the apparatus may further include means for modifying the TMSI based on the offset to identify the paging information.

In one configuration, the encrypted paging information may include a radio network temporary identifier (RNTI) associated with the UE. The information may include an association of different RNTI with different paging information. The encrypted paging information may be decrypted based on the association. The information may further include an offset, and the apparatus may further include means for modifying the RNTI based on the offset to identify the paging information.

In one configuration, the paging message may include integrity protection code for the paging information. The means for decrypting may be configured to generate a code based on the paging information. The means for decrypting may be further configured to descramble the integrity protection code based on a key. The means for decrypting may be further configured to compare the generated code to the descrambled integrity protection code.

In one configuration, the apparatus may further include means for transmitting one of a service request or a resume request to the BS. The one of the service request or the resume request may include the paging information.

The aforementioned means may be one or more of the aforementioned components of the apparatus 702 or the processing system 814 of the apparatus 702' configured to perform the functions recited by the aforementioned means. As described above, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
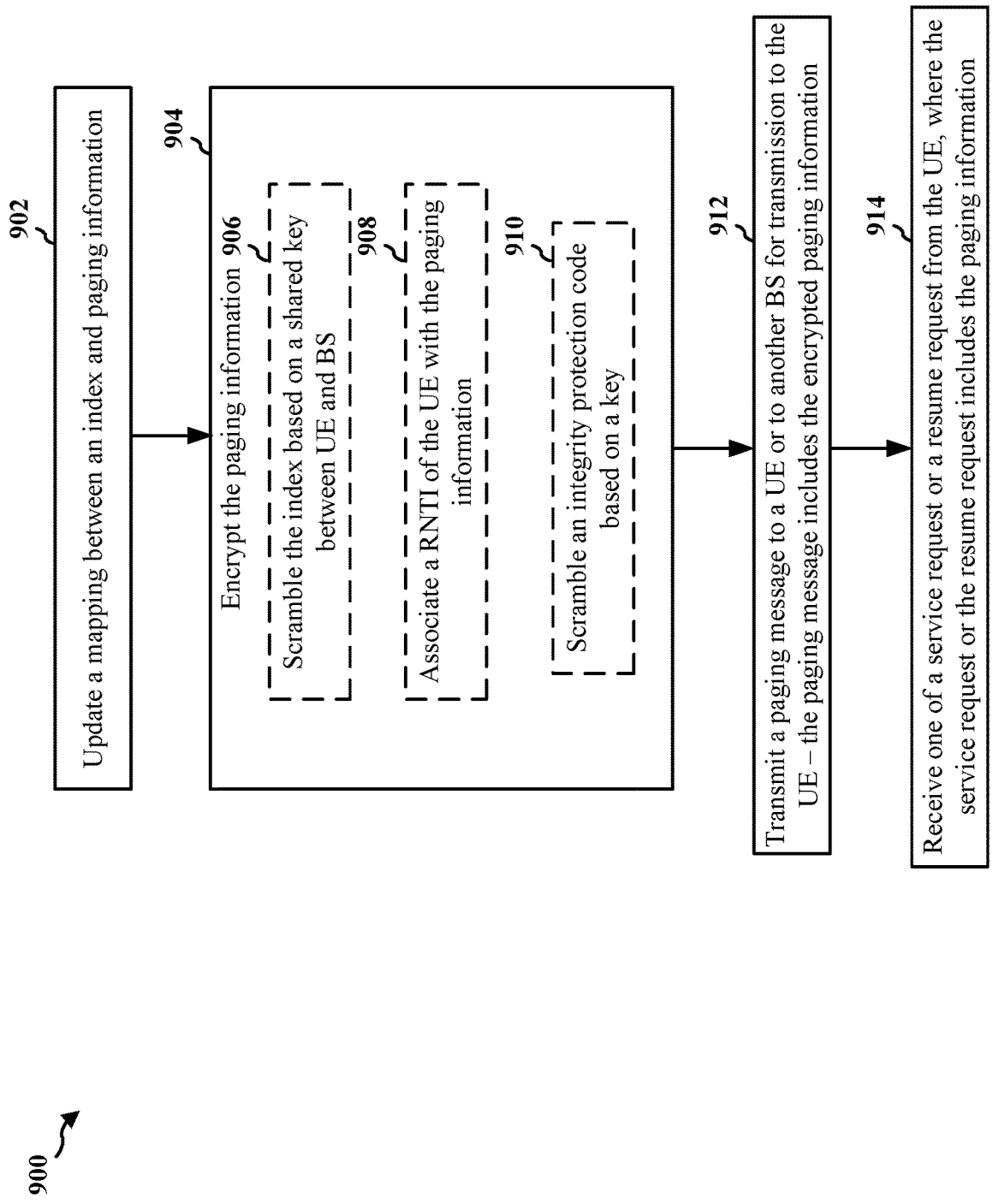
FIG. 9 is a flowchart of an example method of wireless communication at an apparatus of a BS.

FIG. 9 is a flowchart 900 of a method of wireless communication. The method may be performed by a base station (such as the base station 102/180, 310, 504; 750; the apparatus 1002/1002'; the processing system 1114, which may include the memory 376 and which may be the entire base station 310 or a component of the base station 310, such as the TX processor 316, the RX processor 370, or the controller/processor 375). Optional aspects are included in dashed lines. The method allows a base station to encrypt paging information, thereby providing confidentiality to the UE's paging information and improving user privacy.

At 902, the BS updates a mapping between different paging information and indices associated with different paging information. For example, 902 may be performed by reception component 1004 and mapping update component 1006 in FIG. 10. The paging information may include at least one of traffic type or priority. The mapping may be updated during a registration procedure, during a RNAU, or based on an identifier of the UE. For instance, referring to FIG. 5, during the registration procedure 508, the core network 506 may provide a mapping 514 between different paging information (such as traffic types or priority) and indices to the UE 502. When the core network 506 provides the mapping to the base station 504 to be forwarded to the UE 502, the base station 504 may update the mapping (518) at its side to coincide with the mapping of the core network. Moreover, during the RNAU procedure 520, the BS 504 may provide a mapping 526 between different paging information (such as traffic types or priority) and indices to the UE 502, and the BS may update the mapping (528) for additional security. In one example, the BS 504 may update or change the association of the indices to the paging information, and may provide the updated association in the mapping 526 to the UE 502. For instance, the mapping may be updated such that index 1 in FIG. 4 no longer corresponds to "A" priority IMS voice service, but to a different traffic type or priority. In another example, the BS 504 may update the indices by scrambling them based on the I-RNTI 522 of the UE using the AS key 524. For instance, the mapping may be updated to replace each index with a different value resulting from scrambling the last four bits of the I-RNTI based on the AS key.

At 904, the BS encrypts paging information based on information configured during at least one of the registration procedure or the RNAU. For example, 904 may be performed by encryption component 1008 in FIG. 10. In one example, the information includes a mapping between different paging information and indices associated with the different paging information. For instance, referring to FIGS. 4 and 5, during registration procedure 508 or RNAU procedure 520, the base station 504 may configure mapping 402, 514, 526 between the paging information 404 and indices 406 associated with the paging information. In another example, the information includes an association of different RNTI with different paging information. For instance, referring to FIGS. 4 and 5, the base station 504 may configure during RNAU procedure 520 an association of different RNTI, including I-RNTI 522, with different ones of the paging information 404. In another example, the information includes a primary RNTI of the UE.

In one example, the encrypted paging information may include an index associated with the paging information, where the information includes the mapping between different paging information and the indices associated with the different paging information, and the paging information is encrypted based on the mapping. The mapping also may be received from a network during one of paging of the UE or connection of the UE to the BS. The mapping also may be updated, for example, as described in connection with 902. The mapping also may be transmitted to another base station. For instance, referring to FIG. 5, when the UE 502 is in an inactive mode and a paging cause is triggered (for example, the UE is receiving a IMS voice call), the BS 504 may page the UE 502 during RAN-based paging. In an effort to provide confidentiality, the BS 504 may encrypt the paging information (538) before sending the paging message 540. As an example, the BS 504 may include an index (such as index 406) associated with the paging information (such as paging information 404) which is based on the mapping 514, 526. The mapping 514, 526 may be updated or scrambled for different UEs as described above. The mapping also may be received from the core network during paging of the UE, for example, in paging message 534. Additionally, the BS 504 may provide the mapping 546 to the neighbor base station(s) 544 during backhaul signaling.

In another example, the mapping between the index and the paging information includes a fixed mapping. Accordingly, at 906, the base station may scramble the index based on a shared key between the UE and the BS when the base station encrypts the paging information at 904. For example, 906 may be performed by scramble component 1010 in FIG. 10. The shared key may include one of a non-access stratum (NAS) ciphering key or an access stratum (AS) ciphering key. For instance, referring to FIG. 5, when encrypting the paging information (532, 538) which triggered the paging message based on a fixed mapping 402, the core network 506 or base station 504 may scramble the index associated with the paging information based on a shared key with the UE 502 to provide increased security for the UE 502. For example, if CN-based paging is triggered, the core network 506 may scramble the index using the NAS key 512, and the encrypted paging information 536 may include this scrambled index. Similarly, if RAN-based paging is triggered, the base station 504 may scramble the index using the AS key 524, and the encrypted paging information 542 may include this scrambled index.

In a further example, at 908, the BS may associate a radio network temporary identifier (RNTI) of the UE with the paging information when the BS encrypts the paging information at 904. For example, 908 may be performed by RNTI component 1012 in FIG. 10. The encrypted paging information may include the RNTI, where the information includes the association of different RNTI with different paging information, and the paging information is encrypted based on the association. The RNTI of the UE associated with the paging information also may be transmitted to another base station. For instance, referring to FIG. 5, the BS 504 also may encrypt the paging information (538) based on an I-RNTI of the UE. The BS 504 may associate different I-RNTI values with different paging information. As an example, the BS 504 may assign I-RNTI 1 for a voice call, I-RNTI 2 for a data message, and so forth. Based on the associated values, the BS 504 may assign an I-RNTI of the UE to the paging information which triggered the paging message. Additionally, when the BS 504 pages the cells in the RNA of the UE, the BS 504 may provide the assigned I-RNTI 548 to the neighbor base station(s) 544 during the backhaul signaling.

Additionally, the paging message can include an integrity protection code for the paging information. Accordingly, at 910, the BS may scramble the integrity protection code based on a key when the BS encrypts the paging information at 904. For example, 910 may be performed by code component 1014 in FIG. 10. The integrity protection code may include a Message Authentication Code-Integrity (MAC-I). For instance, referring to FIG. 5, when encrypting the paging information (532, 538), the BS 504 may include integrity protection code to protect the integrity of the paging message obtained from the core network 506. The integrity protection code may include, for example, a MAC-I 550, 552. To generate the MAC-I, the BS 504 scrambles the paging information based on a shared key between the UE and the BS. For example, the key may be derived from the AS key 524 transmitted to the UE 502 in the RNAU procedure 520, or the key may be obtained and updated in response to a RRC connection re-establishment request. After generating the MAC-I 550, 552, the BS 504 appends the MAC-I to the paging message 534, 540.

At 912, the BS transmits a paging message to one of the UE or another BS for transmission to the UE, where the paging message includes the encrypted paging information. For example, 912 may be performed by paging message component 1016 and transmission component 1018 in FIG. 10. For instance, referring to FIG. 5, in CN-based paging, after encrypting the paging information (532), the core network may send the paging message 534 including the encrypted paging information 536 to the base station 504 to be forwarded to the UE 502. For instance, the BS 504 may send the paging message 534 directly to the UE 502, or to another BS (such as BS 544) for transmission to the UE 502. Similarly, in RAN-based paging, after encrypting the paging information (538), the BS may send the paging message 540 including the encrypted paging information 542 to the UE 502. For instance, the BS 504 may send the paging message 540 directly to the UE 502, or to another BS (such as BS 544) for transmission to the UE 502.

At 914, the BS receives one of a service request or a resume request from the UE; where the one of the service request or the resume request includes the paging information. For example, 914 may be performed by reception component 1004 and UE request component 1020 in FIG. 10. The paging information in the resume request may be encrypted. The resume request also may be integrity protected. A primary RNTI of the UE also may be included in a Radio Resource Control (RRC) Connection Resume Request received from the UE. For instance, referring to FIG. 5, the BS 504 may receive from the UE 502 a service request 564 in response to the paging message 534 or a resume request 566 in response to the paging message 540. The service request 564 or the resume request 566 may include the paging information (such as the traffic type or priority triggering the paging message). For additional security, the UE 502 may encrypt the paging information in the service request 564 or the resume request 566 using any of the examples described above in encrypting the paging information (532, 538). Similarly, the UE 502 may integrity protect the service request 564 or the resume request 566 using a MAC-I as described above. Additionally, when the UE 502 sends the resume request 566 to the BS 504 in response to RAN-based paging, the UE 502 may include its primary I-RNTI 522 in the request.

Figure 10:
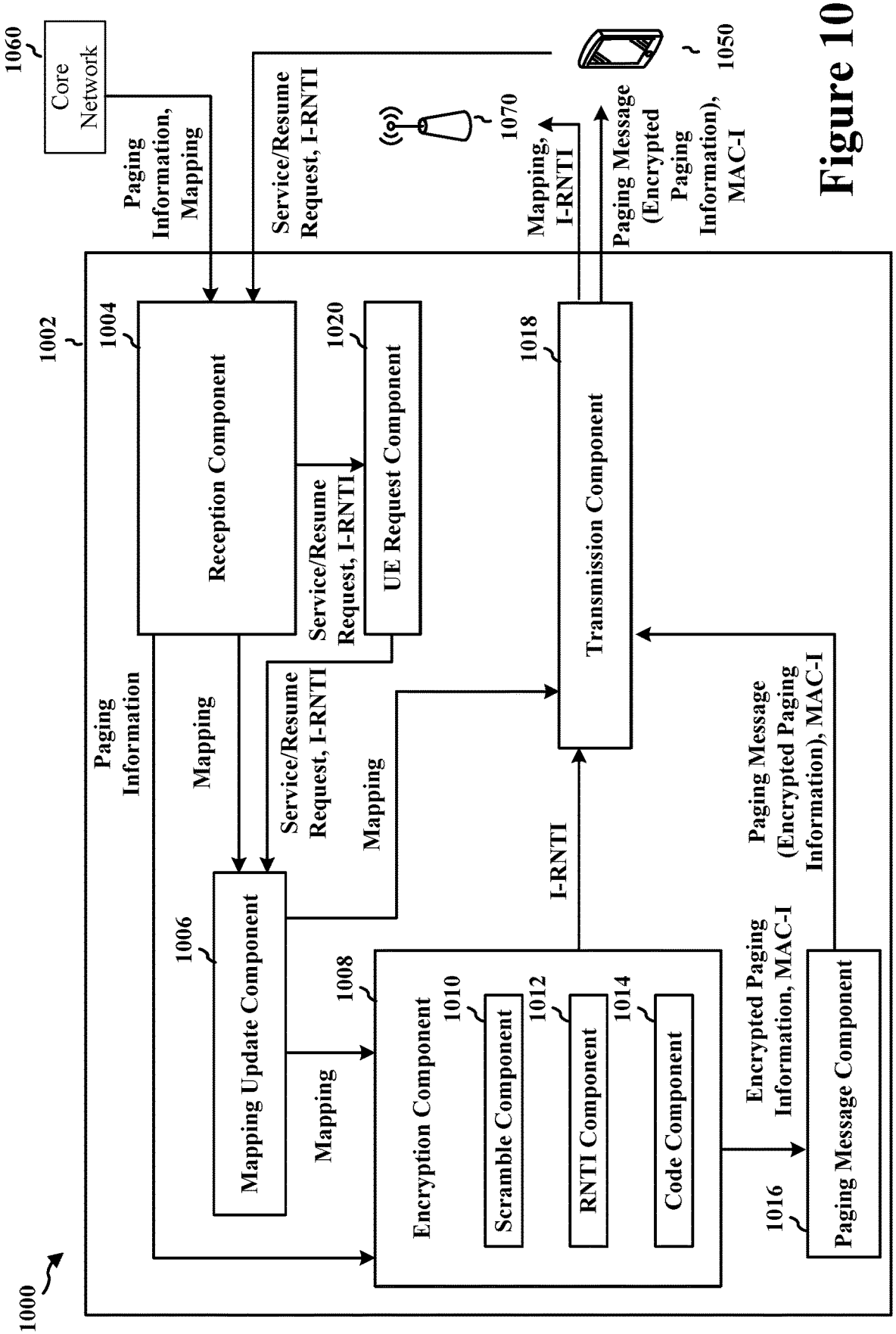
FIG. 10 is a conceptual data flow diagram illustrating the data flow between different means and components in an example apparatus.

FIG. 10 is a conceptual data flow diagram 1000 illustrating the data flow between different means/components in an example apparatus 1002. The apparatus may be a base station (such as the base station 102/180, 310, 504). The apparatus includes a reception component 1004 that receives paging information from a core network 1060 (such as the AMF 192, MME 162, core network 506) for paging of a UE 1050 (such as the UE 104, 350, 502). The reception component 1004 also may receive a mapping from the core network 1060 associating paging information and indices during either paging of the UE or connection of the UE to the BS. The reception component 1004 may further receive one of a service request or a resume request from the UE 1050, for example, as described in connection with 914 in FIG. 9. The apparatus also includes a UE request component 1020 that receives, via the reception component 1004, one of the service request or the resume request from the UE, for example, as described in connection with 914 in FIG. 9. The one of the service request or the resume request may include the paging information. A primary RNTI of the UE may be included in a Radio Resource Control (RRC) Connection Resume Request received from the UE.

The apparatus includes a mapping update component 1006 that updates a mapping between different paging information and indices associated with the different paging information, for example, as described in connection with 902 in FIG. 9. The mapping may be received from the core network 1060 via the reception component 1004, and the mapping update component 1006 may update the mapping during the registration procedure (for example, in response to a service request received from the UE), during a radio access network (RAN)-based Notification Area Update (RNAU) (for example, in response to a resume request received from the UE), or based on an identifier of the UE (for example, the primary RNTI received from the UE).

The apparatus includes an encryption component 1008 that encrypts paging information based on information configured during at least one of the registration procedure or the RNAU, for example, as described in connection with 904 in FIG. 9. The paging information may include at least one of traffic type or priority, and may be received, for example, via the reception component 1004. In one example, the encrypted paging information includes an index associated with the paging information, the information includes a mapping between different paging information and indices associated with the different paging information, and the encryption component 1008 encrypts the paging information based on the mapping. The mapping may be received, for example, from mapping update component 1006. In another example, the mapping includes a fixed mapping, and the apparatus includes a scramble component 1010 that scrambles the index based on a shared key between the UE and the BS, for example, as described in connection with 906 in FIG. 9. In a further example, the apparatus includes a RNTI component 1012 that associates a radio network temporary identifier (RNTI) of the UE with the paging information, for example, as described in connection with 908 in FIG. 9. The encrypted paging information includes the RNTI, the information includes an association of different RNTI with different paging information, and the paging information is encrypted based on the association. In an additional example, the paging message includes integrity protection code for the paging information, and the apparatus includes a code component 1014 that scrambles the integrity protection code based on a key, for example, as described in connection with 910 in FIG. 9. The integrity protection code may include a Message Authentication Code-Integrity (MAC-I).

The apparatus includes a paging message component 1016 that transmits, via a transmission component 1018, a paging message to the UE 1050, for example, as described in connection with 912 in FIG. 9. The paging message including the encrypted paging information, and may include integrity protection code (such as the MAC-I). The apparatus includes the transmission component 1018, which may transmit the paging message to the UE 1050. The transmission component 1018 also may transmit a mapping (such as the mapping updated by mapping update component 1006) to another base station 1070 (such as the base station 544). The transmission component 1018 may further transmit an RNTI of the UE associated with the paging information (such as the I-RNTI associated at RNTI component 1012) to the other base station 1070.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
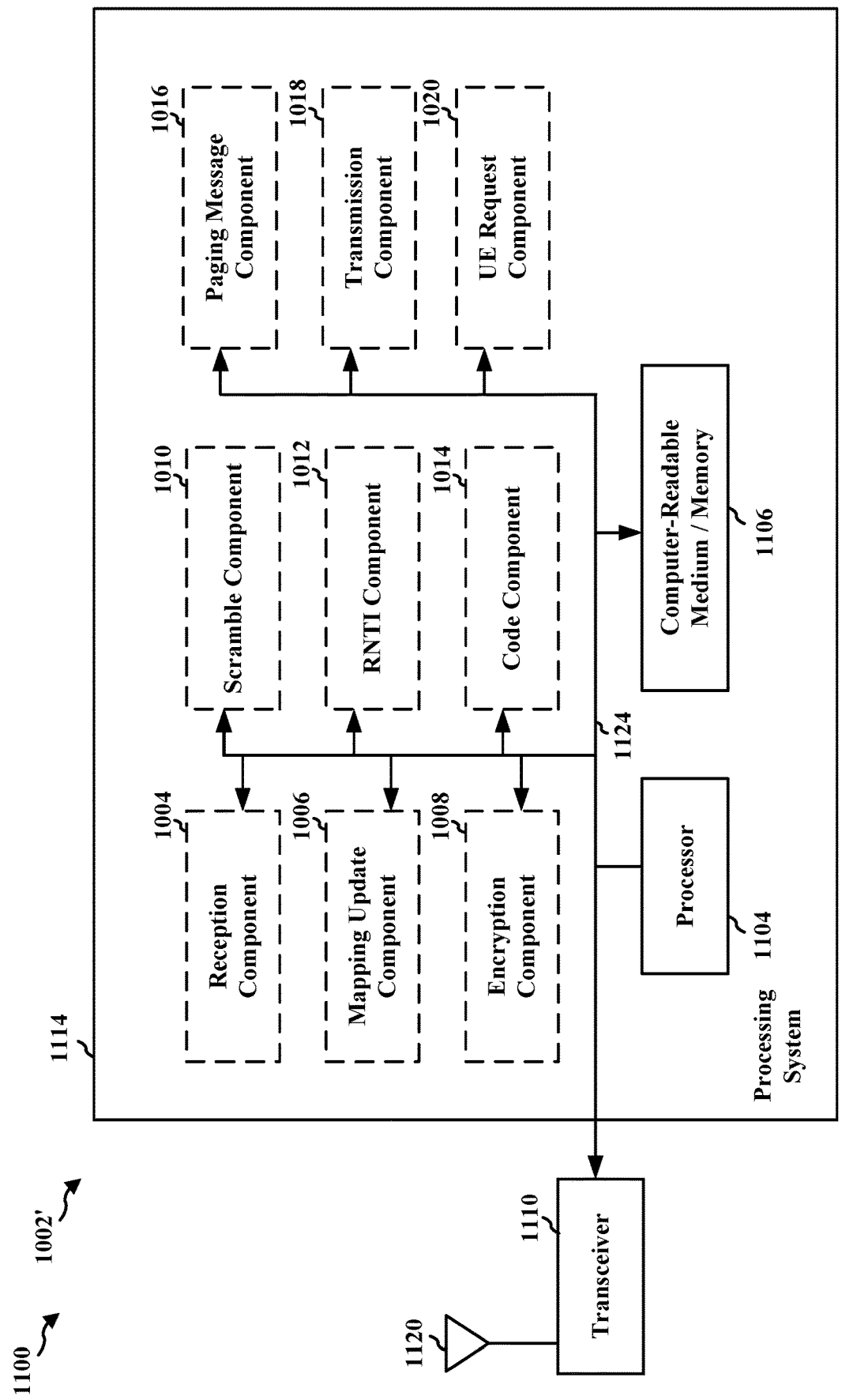
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors or hardware components, represented by the processor 1104, the components 1004, 1006, 1008, 1010, 1012, 1014, 1016, 1018, 1020 and the computer-readable medium/memory 1106. The bus 1124 also may link various other circuits such as timing sources, peripherals, voltage regulators, and power management circuits.

The processing system 1114 may be coupled to an interface such as a transceiver 1110 that is configured to output a paging message for transmission to a UE or another BS for transmission to the UE. The transceiver 1110 is coupled to one or more antennas 1120. The transceiver 1110 provides a means for communicating with various other apparatus over a transmission medium. The transceiver 1110 receives or obtains a signal from the one or more antennas 1120, extracts information from the received signal, and provides the extracted information to the processing system 1114, specifically the reception component 1004. In addition, the transceiver 1110 receives information from the processing system 1114, specifically the transmission component 1018, and based on the received information, generates a signal to be applied to the one or more antennas 1120 which is output for transmission. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described above for any particular apparatus. The computer-readable medium/memory 1106 also may be used for storing data that is manipulated by the processor 1104 when executing software. The processing system 1114 further includes at least one of the components 1004, 1006, 1008, 1010, 1012, 1014, 1016, 1018, 1020. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 or at least one of the TX processor 316, the RX processor 370, and the controller/processor 375. Alternatively, the processing system 1114 may be the entire base station (such as the base station 310 of FIG. 3).

In one configuration, the apparatus 1002/1002' for wireless communication includes means for encrypting paging information. The apparatus further includes means for transmitting a paging message to a user equipment (UE). The paging message includes the encrypted paging information.

In one configuration, the encrypted paging information may include an index associated with the paging information. The paging information may be encrypted based on a mapping between the index and the paging information. In one configuration, the apparatus may further include means for updating the mapping between the index and the paging information when registering the UE with the BS. In one configuration, the apparatus may further include means for updating the mapping during a radio access network (RAN)-based Notification Area Update (RNAU). In one configuration, the apparatus may further include means for updating the mapping based on an identifier of the UE. In one configuration, the mapping includes a fixed mapping. The means for encrypting may be further configured to scramble the index based on a shared key between the UE and the BS.

In one configuration, the means for encrypting may be further configured to associate a radio network temporary identifier (RNTI) of the UE with the paging information. The encrypted paging information may include the RNTI. Different RNTI may be associated with different paging information.

In one configuration the paging message may include integrity protection code for the paging information. The means for encrypting may be further configured to scramble the integrity protection code based on a key.

In one configuration, the apparatus may further include means for receiving one of a service request or a resume request from the UE. The one of the service request or the resume request may include the paging information.

The aforementioned means may be one or more of the aforementioned components of the apparatus 1002 or the processing system 1114 of the apparatus 1002' configured to perform the functions recited by the aforementioned means. As described above, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

Example 1 is a method for wireless communication at a UE, including: receiving a paging message from a BS, the paging message including encrypted paging information; decrypting the encrypted paging information to identify paging information, where the encrypted paging information is decrypted based on information obtained during at least one of a registration procedure or a radio access network (RAN)-based Notification Area Update (RNAU); and determining whether to communicate with the BS based on the paging information.

Example 2 is the method of Example 1, where the encrypted paging information includes an index associated with the paging information, where the information includes a mapping between different paging information and indices associated with the different paging information, and the encrypted paging information is decrypted based on the mapping.

Example 3 is the method of any of Examples 1 and 2, where the mapping is received during the registration procedure.

Example 4 is the method of any of Examples 1 to 3, where the information further includes an updated mapping between the different paging information and the indices associated with the different paging information, and the updated mapping is received during the registration procedure, during the RNAU, or based on an identifier of the UE.

Example 5 is the method of any of Examples 1 to 4, where the mapping includes a fixed mapping, and the index is scrambled based on a shared key between the UE and the BS, where the shared key includes one of a NAS ciphering key or an AS ciphering key.

Example 6 is the method of any of Examples 1 to 5, where the encrypted paging information includes a TMSI associated with the UE, where the information includes an association of different TMSI with different paging information, and the encrypted paging information is decrypted based on the association.

Example 7 is the method of any of Examples 1 to 6, where the information further includes an offset, and where the decrypting further includes modifying the TMSI based on the offset to identify the paging information.

Example 8 is the method of any of Examples 1 to 7, further including determining a paging occasion for receiving the paging message based on a primary TMSI of the UE.

Example 9 is the method of any of Examples 1 to 8, where the encrypted paging information includes a RNTI associated with the UE, where the information includes an association of different RNTI with different paging information, and the encrypted paging information is decrypted based on the association.

Example 10 is the method of any of Examples 1 to 9, where the information further includes an offset, and where the decrypting further includes modifying the RNTI based on the offset to identify the paging information.

Example 11 is the method of any of Examples 1 to 10, where the paging message includes integrity protection code for the paging information, and where the decrypting includes: generating a code based on the paging information; descrambling the integrity protection code based on a key; and comparing the generated code to the descrambled integrity protection code.

Example 12 is the method of any of Examples 1 to 11, further including: transmitting one of a service request or a resume request to the BS; where the one of the service request or the resume request includes the paging information.

Example 13 is a device including one or more processors and one or more memories in electronic communication with the one or more processors storing instructions executable by the one or more processors to cause the system or apparatus to implement a method as in any of Examples 1-12.

Example 14 is a system or apparatus including means for implementing a method or realizing an apparatus as in any of Examples 1-12.

Example 15 is a non-transitory computer readable medium storing instructions executable by one or more processors to cause the one or more processors to implement a method as in any of Examples 1-12.

Example 16 is a method for wireless communication at a BS, including: encrypting paging information based on information configured during at least one of a registration procedure or a radio access network (RAN)-based Notification Area Update (RNAU); and transmitting a paging message to one of a UE or another BS for transmission to the UE, the paging message including the encrypted paging information.

Example 17 is the method of Example 16, where the encrypted paging information includes an index associated with the paging information, where the information includes a mapping between different paging information and indices associated with the different paging information, and the paging information is encrypted based on the mapping.

Example 18 is the method of any of Examples 16 and 17, where the mapping is received from a network during one of paging of the UE or connection of the UE to the BS.

Example 19 is the method of any of Examples 16 to 18, further including transmitting the mapping to the another BS.

Example 20 is the method of any of Examples 16 to 19, where the encrypting includes:
associating a radio network temporary identifier (RNTI) of the UE with the paging information, where the encrypted paging information includes the RNTI, where the information includes an association of different RNTI with different paging information, and the paging information is encrypted based on the association.

Example 21 is the method of any of Examples 16 to 20, further including transmitting the RNTI of the UE associated with the paging information to the another BS.

Example 22 is a device including one or more processors and one or more memories in electronic communication with the one or more processors storing instructions executable by the one or more processors to cause the system or apparatus to implement a method as in any of Examples 16-21.

Example 23 is a system or apparatus including means for implementing a method or realizing an apparatus as in any of Examples 16-21.

Example 24 is a non-transitory computer readable medium storing instructions executable by one or more processors to cause the one or more processors to implement a method as in any of Examples 16-21.

What is claimed is:

1. A method for wireless communication at an apparatus of a user equipment (UE), comprising:
    receiving, from a base station (BS), during at least one of a registration procedure or a radio access network (RAN)-based Notification Area Update (RNAU), information indicating a mapping between different paging information and indices associated with the different paging information;
    receiving, from the BS, a paging message comprising encrypted paging information;
    decrypting the encrypted paging information to identify an index included in the encrypted paging information;
    determining paging information corresponding to the index based on the mapping; and
    determining whether to communicate with the BS based on the paging information.

2. The method of claim 1, wherein the receiving the information comprises receiving the mapping during the registration procedure.

3. The method of claim 2, wherein the information further indicates an updated mapping between the different paging information and the indices associated with the different paging information, and wherein the receiving the information comprises receiving the updated mapping during the registration procedure, during the RNAU, or based on an identifier of the UE.

4. The method of claim 1, wherein the mapping includes a fixed mapping, and the index is scrambled based on a shared key between the UE and the BS, wherein the shared key includes one of a non-access stratum (NAS) ciphering key or an access stratum (AS) ciphering key.

5. The method of claim 1, wherein the encrypted paging information includes a temporary mobile subscriber identifier (TMSI) associated with the UE, wherein the information includes an association of different TMSI with the different paging information, and wherein the decrypting comprises decrypting the encrypted paging information based on the association.

6. The method of claim 5, wherein the information further includes an offset, and wherein the decrypting comprises modifying the TMSI based on the offset to identify the paging information.

7. The method of claim 1, further comprising determining a paging occasion for receiving the paging message based on a primary temporary mobile subscriber identifier (TMSI) of the UE.

8. The method of claim 1, wherein the encrypted paging information includes a radio network temporary identifier (RNTI) associated with the UE, wherein the information includes an association of different RNTI with the different paging information, and wherein the decrypting comprises decrypting the encrypted paging information based on the association.

9. The method of claim 8, wherein the information further includes an offset, and wherein the decrypting comprises modifying the RNTI based on the offset to identify the paging information.

10. The method of claim 1, wherein the paging message includes integrity protection code for the paging information, and wherein the decrypting comprises:
generating a code based on the paging information;
descrambling the integrity protection code based on a key; and
comparing the generated code to the descrambled integrity protection code.

11. The method of claim 1, further comprising:
transmitting one of a service request or a resume request to the BS;
wherein the one of the service request or the resume request includes the paging information.

12. An apparatus for wireless communication, comprising:
an interface configured to:
receive, from a base station (BS), during at least one of a registration procedure or a radio access network (RAN)-based Notification Area Update (RNAU), information indicating a mapping between different paging information and indices associated with the different paging information, and
receive, from the BS, a paging message comprising encrypted paging information; and
a processing system configured to:
decrypt the encrypted paging information to identify an index included in the encrypted paging information,
determine paging information corresponding to the index based on the mapping, and
determine whether to communicate with the BS based on the paging information.

13. The apparatus of claim 12, wherein the mapping includes a fixed mapping, and the index is scrambled based on a shared key between a user equipment (UE) and the BS.

14. The apparatus of claim 12, wherein the encrypted paging information includes a temporary mobile subscriber identifier (TMSI) associated with a user equipment (UE), wherein the information includes an association of different TMSI with the different paging information, and the encrypted paging information is decrypted based on the association.

15. The apparatus of claim 14, wherein the information further includes an offset, and wherein the processing system is further configured to modify the TMSI based on the offset to identify the paging information.

16. The apparatus of claim 12, wherein the encrypted paging information includes a radio network temporary identifier (RNTI) associated with a user equipment (UE), wherein the information includes an association of different RNTI with the different paging information, and the encrypted paging information is decrypted based on the association.

17. The apparatus of claim 16, wherein the information further includes an offset, and wherein the processing system is further configured to modify the RNTI based on the offset to identify the paging information.

18. The apparatus of claim 12, wherein the paging message includes integrity protection code for the paging information, and wherein the processing system is further configured to:
generate a code based on the paging information;
descramble the integrity protection code based on a key; and
compare the generated code to the descrambled integrity protection code.

19. The apparatus of claim 12, wherein the processing system is further configured to:
transmit one of a service request or a resume request to the BS;
wherein the one of the service request or the resume request includes the paging information.

20. A method for wireless communication at an apparatus of a base station (BS), the method comprising:
transmitting, to a user equipment (UE), during at least one of a registration procedure or a radio access network (RAN)-based Notification Area Update (RNAU), information indicating a mapping between different paging information and indices associated with the different paging information;
encrypting paging information based on the information; and
transmitting, to one of the UE or another BS for transmission to the UE, a paging message comprising the encrypted paging information.

21. The method of claim 20, wherein the encrypted paging information includes an index associated with the paging information.

22. The method of claim 21, further comprising receiving, from a core network, the mapping during one of paging of the UE or connection of the UE to the BS.

23. The method of claim 21, further comprising transmitting the mapping to the another BS.

24. The method of claim 20, further comprising:
associating a radio network temporary identifier (RNTI) of the UE with the paging information, wherein the encrypted paging information includes the RNTI,
wherein the information includes an association of different RNTI with the different paging information, and
wherein the encrypting comprises encrypting the paging information based on the association.

25. The method of claim 24, further comprising transmitting the RNTI of the UE associated with the paging information to the another BS.

26. An apparatus for wireless communication, comprising:
a processing system configured to encrypt paging information based on information indicating a mapping between different paging information and indices associated with the different paging information; and
an interface configured to:
output, for transmission to one of a user equipment (UE) or a base station to transmit to the UE, during at least one of a registration procedure or a radio access network (RAN)-based Notification Area Update (RNAU), the information indicating the mapping, and
output, for transmission to the one of the UE or the base station to transmit to the UE, a paging message comprising the encrypted paging information.

27. The apparatus of claim 26, wherein the encrypted paging information includes an index associated with the paging information.

28. The apparatus of claim 26, wherein the processing system is further configured to:
associate a radio network temporary identifier (RNTI) of the UE with the paging information, wherein the encrypted paging information includes the RNTI,
wherein the information includes an association of different RNTI with the different paging information, and the paging information is encrypted based on the association.

* * * * *